US006362411B1

(12) United States Patent
Suzuki et al.

(10) Patent No.: US 6,362,411 B1
(45) Date of Patent: Mar. 26, 2002

(54) APPARATUS FOR AND METHOD OF INPUTTING MUSIC-PERFORMANCE CONTROL DATA

(75) Inventors: Hideo Suzuki; Masao Sakama, both of Hamamatsu (JP)

(73) Assignee: Yamaha Corporation (JP)

( * ) Notice: Subject to any disclaimer, the term of this patent is extended or adjusted under 35 U.S.C. 154(b) by 0 days.

(21) Appl. No.: 09/492,435

(22) Filed: Jan. 27, 2000

(30) Foreign Application Priority Data

Jan. 29, 1999 (JP) .......................................... 11-022823
Jan. 29, 1999 (JP) .......................................... 11-022824
Jan. 29, 1999 (JP) .......................................... 11-022825

(51) Int. Cl.[7] ........................... G10H 1/02; G10H 7/00; G01D 3/00

(52) U.S. Cl. ........................................... 84/626; 84/662

(58) Field of Search ......................... 84/615, 653, 626, 84/662

(56) References Cited

U.S. PATENT DOCUMENTS 5,142,960 A * 9/1992 Iwase et al. .............. 84/626 X
5,453,569 A * 9/1995 Saito et al. ............... 84/626 X
5,739,453 A * 4/1998 Chihana et al. ............... 84/615
5,831,195 A * 11/1998 Nakata ..................... 84/615 X

FOREIGN PATENT DOCUMENTS

JP 9-6346 1/1997

* cited by examiner

*Primary Examiner*—Jeffrey Donels
(74) *Attorney, Agent, or Firm*—Morrison & Foerster LLP

(57) ABSTRACT

Control data are extracted from tone waveforms obtained by actually playing acoustic musical instruments in various styles of rendition, and a plurality of these control data are stored in memory to provide databases. Automatic or manual music performance data are supplied in real or non-real time. Desired one or more notes are selected from among the supplied music performance data, and a desired style of rendition is selected in corresponding relation to the selected notes. Then, one or more control data corresponding to the selected style of rendition are read out from the memory so that generation of a tone corresponding to the selected notes can be controlled in accordance with the read-out control data. In this way, characteristics of the selected style of rendition can be imparted to any particular note or notes included in the music performance data. The control data are stored in the memory in association with partial sounding segments such as an attack, body and release. The partial sounding segments are subjected to tone generation control based on the control data, in accordance with the selected style of rendition.

22 Claims, 18 Drawing Sheets

APPARATUS FOR AND METHOD OF INPUTTING MUSIC-PERFORMANCE CONTROL DATA

BACKGROUND OF THE INVENTION

The present invention relates generally to apparatus for and methods of inputting music-performance control data, and more particularly to a technique which can effectively improve and control the quality of performance tones generated on the basis of previously-provided automatic performance data of, for example, a piece of music by imparting control data, pertaining performance effects such as in tone pitch, volume and color, to the automatic performance data and editing the automatic performance data.

Techniques of inputting control data, such as pitch bend and volume control data continuously varying over time, and imparting the thus-input control data to automatic performance data have been known, one of which is disclosed in Japanese Patent Laid-open Publication No. HEI-9-6346. The disclosed technique is characterized primarily by prestoring, for each desired type of musical instrument, a plurality of control data templates each made up of a control data train that corresponds to a rise to fall of an instrument's tone and selecting and incorporating a desired one of these prestored control data templates into the automatic performance data.

Specifically, the conventionally-known techniques prestore control data templates corresponding to typical styles of rendition, for each of the musical instruments. However, each of these control data templates is arranged in such a simplified form as to merely express characteristics of the musical instrument to a certain degree and never provides for a faithful reproduction of characteristics of an actual performance tone of the musical instrument in question. Thus, even when a human operator or player believes that he or she has selected one of the control data templates fitting a desired style of rendition of guitar or the like and imparted it to automatic performance data, an actual reproduction of the automatic performance data would often prove to be unsatisfactory in that the style of rendition expressed in the reproduced performance is not what the human operator initially intended or far from the performance and style of rendition of a corresponding natural instrument. For these reasons, with the conventional techniques, it has been very difficult to impart control data which allow performance in various styles of rendition with high quality as afforded by the natural instruments.

SUMMARY OF THE INVENTION

In view of the foregoing, it is an object of the present invention to provide an apparatus for and method of inputting music-performance control data which can readily impart, to music performance data, high-quality performance expressions as afforded by natural instruments.

In order to accomplish the above-mentioned object, the present invention provides an apparatus for inputting music-performance control data which comprises: memory storing a plurality of control data extracted from tone waveforms of acoustic musical instruments actually played in various styles of rendition; a supply device adapted to supply music performance data; an operator device; and a processor coupled with the memory, supply device and operator device. The processor in the present invention is arranged to: select a desired style of rendition in response to operation of the operator device and in corresponding relation to one or more notes selected from among the music performance data; and read out, from the memory, one or more of the control data corresponding to the selected style of rendition, so that a characteristic of the selected style of rendition is imparted to the selected notes in the music performance data.

According to the present invention, there are prestored in the memory a plurality of control data extracted from tone waveforms obtained by actually playing acoustic musical instruments in various styles of rendition. Desired style of rendition is selected with respect to or in corresponding relation to desired one or more notes included in the music performance data, and one or more control data corresponding to the selected style of rendition are read out from the memory. When a tone is to be generated on the basis of the music performance data, the read-out control data are used to set and control characteristics of that tone. With such arrangements, the apparatus of the present invention readily achieves high-quality renditions as afforded by natural instruments.

For example, the music performance data may be automatic performance data. In such a case, the processor may be arranged to incorporate style-of-rendition designating information, indicative of the selected style of rendition, into a sequence of the music performance data, and the style-of-rendition designating information is used to read out, from the memory, the one or more control data corresponding to the selected style of rendition. The apparatus of the present invention may further comprise a storage for storing a performance sequence, in which case the sequence of the music performance data, having the style-of-rendition designating information incorporated therein, is stored in the storage.

As another example, the music performance data may be data generated by a real-time performance on a keyboard or other performance operator device. In this case, the processor may be arranged to: select a desired style of rendition in real time in response to operation of the operator device and in corresponding relation to the music performance data supplied in real time by the supply device; read out, from the memory, the control data corresponding to the selected style of rendition; and control a characteristic of a tone corresponding to the supplied music performance data in real time in accordance with the read-out control data, to thereby generate the tone corresponding to the supplied music performance data. Of course, the selection and impartment of the desired style of rendition may be conducted in real time, during the course of an automatic performance, in corresponding relation to the music performance data supplied in real time.

Further, the plurality of control data stored in the memory may include control data corresponding to partial sounding segments of a tone, and each of the partial sounding segments may correspond to any one of a plurality of segmental states of the tone from the rise to fall thereof, such as in the segments commonly called "attack", "body" and "release". With such arrangements, an optimum style of rendition can be input and an optimum rendition can be realized on the basis of the thus-input style of rendition, for each of the partial sounding segments. In this way, the apparatus of the present invention readily achieves high-quality renditions as afforded by natural instruments.

The plurality of control data stored in the memory may include control data corresponding to a style of rendition that pertains to a plurality of notes to be performed in succession; examples of such a style of rendition include "crescendo", "decrescendo" and the like which involve a plurality of notes, and, perhaps, grace note impartment. The plurality of control data stored in the memory may include control data corresponding to a style of rendition that pertains to a connection between two successive notes. Examples of such a style of rendition include "tie" and "slur".

The memory may have stored therein, in association with each style of rendition, at least two of control data indicative of a pitch variation over time, control data indicative of an amplitude variation over time and control data indicative of a tone color variation over time. Use of the control data indicative of the timewise variations of these tonal factors allows optimum control to be performed on each individual style of rendition. Further, the memory may have stored therein control data corresponding to a plurality of different tonal factors, in association with each individual style of rendition. In this case, each selectable style of rendition may correspond to one partial sounding segment of a tone, and in response to selection of a particular one of the styles of rendition, a plurality of the control data corresponding to the tonal factors of the partial sounding segment associated with the particular style of rendition may be read out from the memory. Such arrangements allow a desired style of rendition to be input appropriately for each of the partial sounding segments, thereby readily achieving high-quality renditions based on the thus-input styles of rendition.

Further, the memory may have stored therein a plurality of control data different from each other in degree of control, in association with each group nominally similar styles of rendition. In this case, the processor may be arranged to select the desired style of rendition by performing a combination of operations of selecting a group of nominally similar styles of rendition and selecting one of the degrees of control represented by the selected group of styles of rendition. For example, for a "bend-up" rendition of a wind instrument, two or more different control data, rather than just one control data, are prestored in the memory which correspond to different levels of "speed" or "depth" that is one of the control factors of the bend-up rendition. Such arrangements also readily achieve high-quality renditions.

Further, the plurality of control data stored in the memory may include control data corresponding to at least one of a plurality of styles of rendition performable on wind instruments which typically include bend-up, bend-down, bend-downup, grace-up, grace-down, chromatic-up, chromaticdown, gliss-up, gliss-down, staccato, vibrato, shortcut, tenuto, slur, crescendo and decrescendo renditions. This arrangement allows styles of rendition, unique to or peculiar to various brass or woodwind instruments, to be input with ease, and also readily achieves performances in these rendition styles.

Further, the plurality of control data stored in the memory may include control data corresponding to at least one of a plurality of styles of rendition performable on rubbed string instruments, such as a guitar and bass, which typically include choking, gliss-up, gliss-down, vibrato, bend-downup, shortcut, mute, hammer-on, pull-off, slide-up, slide-down, crescendo and decrescendo renditions. This arrangement allows styles of rendition, peculiar to various rubbed string instruments, to be input with ease, and also readily achieves performances in these rendition styles.

Further, the plurality of control data stored in the memory may include control data corresponding to at least one of a plurality of styles of rendition performable on wind instruments, such as a violin, which typically include bend-up, grace-up, grace-down, staccato, detache, vibrato, bend-downup, shortcut, mute, chromatic-up, chromatic-down, gliss-up, gliss-down, tenuto, slur, crescendo and decrescendo renditions. This arrangement also allows styles of rendition, peculiar to various rubbed string instruments, to be input with ease, and also readily achieves performances in these rendition styles.

The control data corresponding to one style of rendition, which is stored in the memory, may include a plurality of variations pertaining to at least one of a plurality of rendition control factors including a depth and speed of the rendition and a specific number of tones involved in the rendition. For the bend-up rendition, for example, the control data may include a plurality of variations pertaining to at least one of the "depth" and "speed". Further, for the grace-up and grace-down renditions, the control data may include a plurality of variations pertaining to at least one of the "number of tones" and "speed". For the chromatic-up and chromatic-down renditions, the control data may include a plurality of variations pertaining to at least the "speed". For the gliss-up and gliss-down renditions, the control data may include a plurality of variations pertaining to at least the "speed". Further, for the vibrato rendition, the control data may include a plurality of variations pertaining to at least one of the "speed", "depth" and "length". For the shortcut rendition, the control data may include a plurality of variations pertaining to at least the "speed". Similarly, for the tenuto rendition, the control data may include a plurality of variations pertaining to at least the "speed".

The processor may be further arranged to generate a parameter for controlling the selected style of rendition and use the thus-generated parameter to modify the control data read out from the memory in response to the selected style of rendition. By thus modifying the control data stored in the memory, it is possible to expand the variations of the styles of rendition inputtable and impartable via the inventive apparatus.

It should also be appreciated that the present invention is not limited to the style-of-rendition inputting apparatus as described above, and may be implemented as an electronic musical instrument or electronic music apparatus which is capable of generating a tone with a characteristic of an input style of rendition.

Further, the apparatus of the present invention may have only a tone reproducing function of the present invention without being equipped with the style-of-rendition inputting function. Namely, the present invention also provides an electronic music apparatus comprising: a memory storing a plurality of control data extracted from tone waveforms of acoustic musical instruments actually played in various styles of rendition; a supply device adapted to supply a performance sequence including music performance data and style-of-rendition designating information indicative of a style of rendition selected in corresponding relation to one or more notes selected from among the music performance data, the style-of-rendition designating information being used to read out, from the memory, one or more of the control data which correspond to the selected style of rendition; and a processor coupled with the memory and the supply device. The processor in this invention is arranged to: read out the control data corresponding to the style-of-rendition designating information from the memory, in accordance with the music performance data and style-of-rendition designating information of the performance sequence; and generate a tone corresponding to the music performance data with a characteristic controlled in accordance with the control data read out from the memory.

The present invention may be constructed and implemented not only as the apparatus invention as discussed above but also as a method invention. The present invention may also be implemented as a program for execution by a processor such as a computer and DSP, as well as a machine-readable storage medium storing such a program. Further, the present invention may be implemented as a storage medium storing control data corresponding to various styles of rendition.

BRIEF DESCRIPTION OF THE DRAWINGS

For better understanding of the object and other features of the present invention, its preferred embodiments will be described in greater detail hereinbelow with reference to the accompanying drawings, in which.

DETAILED DESCRIPTION OF THE PREFERRED EMBODIMENTS

Figure 2:
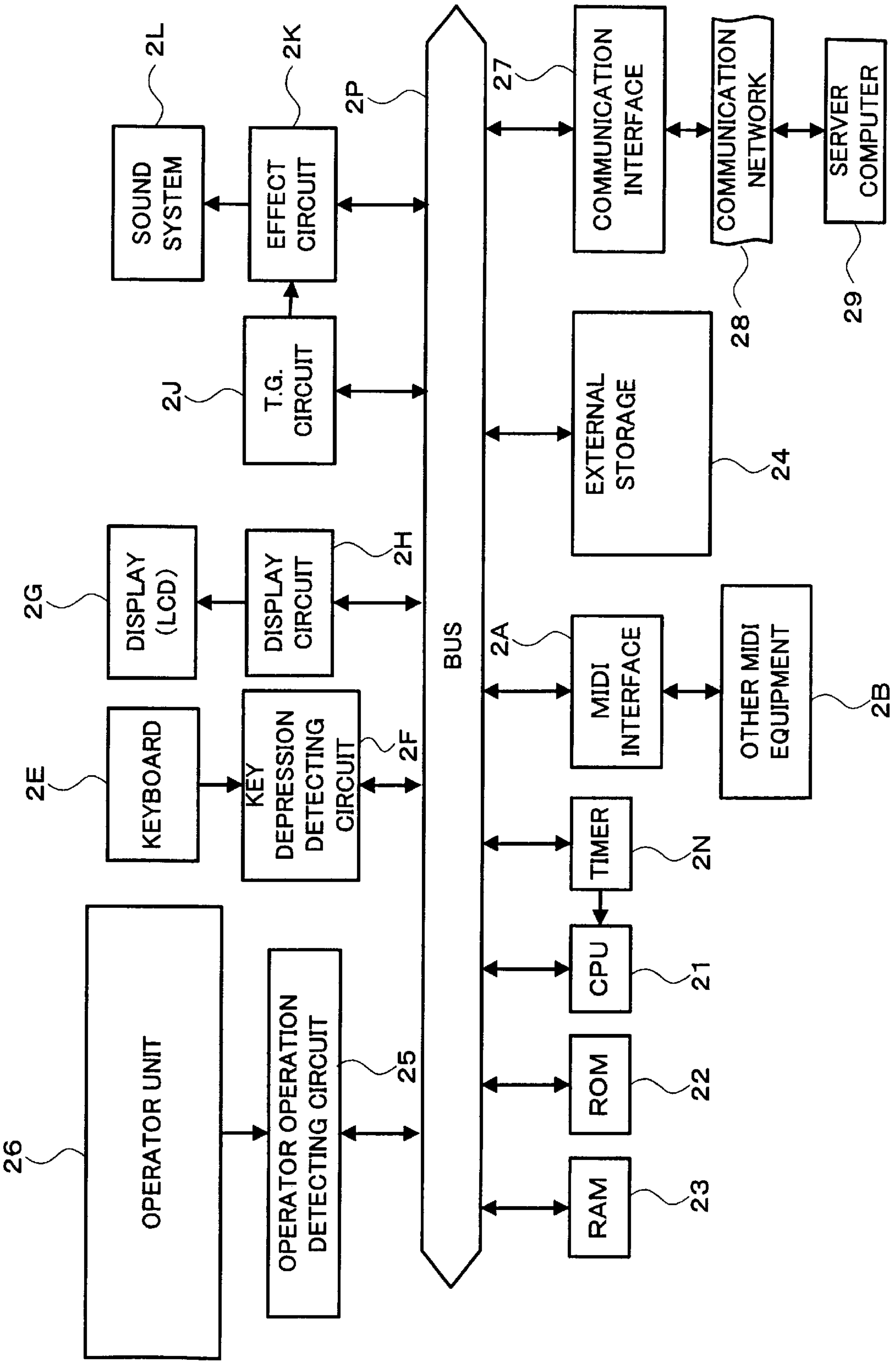
FIG. 2 is a block diagram showing a general hardware setup of the automatic performance apparatus containing the automatic-performance-control-data input apparatus in accordance with a preferred embodiment of the present invention.

Referring first to FIG. 2, there is shown a block diagram showing a general hardware setup of an automatic performance apparatus which contains an automatic-performance-control-data input apparatus in accordance with a preferred embodiment of the present invention. The behavior of the automatic performance apparatus is controlled by a CPU 21. To the CPU 21 are connected, via a data and address bus 2P, a program memory (ROM) 22, a working memory (RAM) 23, an external storage device 24, an operator operation detecting circuit 25, a communication interface 27, a MIDI interface 2A, a key depression detecting circuit 2F, a display circuit 2H, a tone generator (T.G.) circuit 2J and an effect circuit 2K. For convenience, the following description will be made in relation to a case where only minimum necessary resources are used, although the automatic performance apparatus may of course include any other hardware components.

In the automatic performance apparatus, the CPU 21 performs various processing based on various software programs and data (such as automatic performance data and style-of-rendition parameters) stored in the program memory 22 and working memory 23 and various other data supplied from the external storage device 24. In the illustrated example, the external storage device 24 may comprises one or more of a floppy disk drive (FDD), hard disk drive (HDD), CD-ROM drive, magneto optical (MO) disk drive, ZIP drive, PD drive, DVD (Digital Versatile Disk) drive, etc. Music piece information may be received from other MIDI equipment 2B or the like via the MIDI interface 2A. The CPU 21 supplies the tone generator circuit 2J with the music piece information thus given from the external storage device 24, so that each tone signal generated by the tone generator circuit 2J on the basis of the music piece information is audibly reproduced or sounded via an external sound system 2L including an amplifier and speaker.

The program memory 22, which is a read-only memory (ROM), has prestored therein various programs, including system-related programs, for execution by the CPU 21, as well as various parameters and data. The working memory 23, which is provided for temporarily storing various data occurring as the CPU 21 executes the programs, is allocated in predetermined address regions of a random access memory (RAM) and used as registers, flags, etc. Instead of the operating program, various data and the like being prestored in the program memory 22, they may be prestored in the external storage device 24 such as the CD-ROM drive. The operating program and various data thus prestored in the external storage device 24 can be transferred to the RAM 23 or the like for storage therein so that the CPU 21 can operate in exactly the same way as in the case where the operating program and data are prestored in the internal program memory 22. This arrangement greatly facilitates version-upgrade of the operating program, installation of a new operating program, etc.

Further, the automatic performance apparatus may be connected via the communication interface 27 to a communication network 28 such as a LAN (Local Area Network), the Internet or telephone line network to exchange data (music piece information accompanied by relevant data) with a desired sever computer 29, in which case the operating program and various data can be downloaded from the server computer 29. In such a case, the automatic performance apparatus, which is a “client” personal computer, sends a command to request the server computer 29 to download the operating program and various data by way of the communication interface 27 and communication network 28. In response to the command from the automatic performance apparatus, the server computer 29 delivers the requested operating program and data to the automatic performance apparatus via the communication network 28. The automatic performance apparatus receives the operating program and data via the communication interface 27 and store them into the RAM 23 or the like. In this way, the necessary downloading of the operating program and various data is completed.

Note that the present invention may be implemented by a personal computer or the like where are installed the operating program and various data corresponding to the functions of the present invention. In such a case, the operating program and various data corresponding to the present invention may be supplied to users in the form of a storage medium, such as a CD-ROM and floppy disk, that is readable by an electronic musical instrument.

Operator unit 26 of FIG. 2 includes various operators, such as keys and switches, for setting various parameters. For convenience, the preferred embodiment of the present invention will be described in relation to a specific case where the operator unit 26 includes a key and function keys whose functions are caused to vary in accordance with displayed contents on the display 2G. The operator operation detecting circuit 25 constantly detects respective operational states of the individual switches, keys, mouse and the like on the operator unit 26 and outputs operator operation information, representative of the detected operational states, to the CPU 21 via the data and address bus 2P. Keyboard 2E includes a plurality of keys for selecting a pitch of each tone to be generated, which is used in the described embodiment not only for a manual performance but also as input keys for entering automatic performance data corresponding to the manual performance on the keyboard 2E. The key depression detecting circuit 2F includes key switch circuits provided in corresponding relation to the individual keys of the keyboard 2E. Whenever any one of the keys is newly depressed on the keyboard 2E, the key depression detecting circuit 2F outputs key-on event data including a note number of the depressed key, while whenever any one of the keys is newly released on the keyboard 2E, the key depression detecting circuit 2E outputs key-off event data including a note number of the released key. Display 2G in the illustrated example comprises an LCD (Liquid Crystal Display) or the like and is controlled by the display circuit 2H.

The tone generator circuit 2J, which is capable of simultaneously generating tone signals in a plurality of channels, receives music piece information (MIDI files) supplied via the data and address bus 2P and MIDI interface 2A and generates tone signals based on these received information. The tone generation channels to simultaneously generate a plurality of tone signals in the tone generator circuit 2J may be implemented by using a single circuit on a time-divisional basis or by providing a separate circuit for each of the channels. Further, any tone signal generation scheme may be used in the tone generator circuit 2J depending on an application intended. Each of the tone signals output from the tone generator circuit 2J is audibly reproduced through the sound system 2L. Also note that there is further provided, between the tone generator circuit 2J and the sound system 2L, the effect circuit 2K for imparting various effects to the tone signals generated by the tone generator circuit 2J. In an alternative, the tone generator circuit 2J may itself contain such an effect circuit 2K. Timer 2N generates tempo clock pulses to be used for measuring a designated time interval or setting a reproduction tempo of the music piece information. The frequency of the tempo clock pulses generated by the timer 2N is adjustable via a tempo switch (not shown). The tempo clock pulse from the timer N is given to the CPU 21 as an interrupt instruction, so that the CPU 21 interruptively carries out various operations for an automatic performance.

Figure 1:
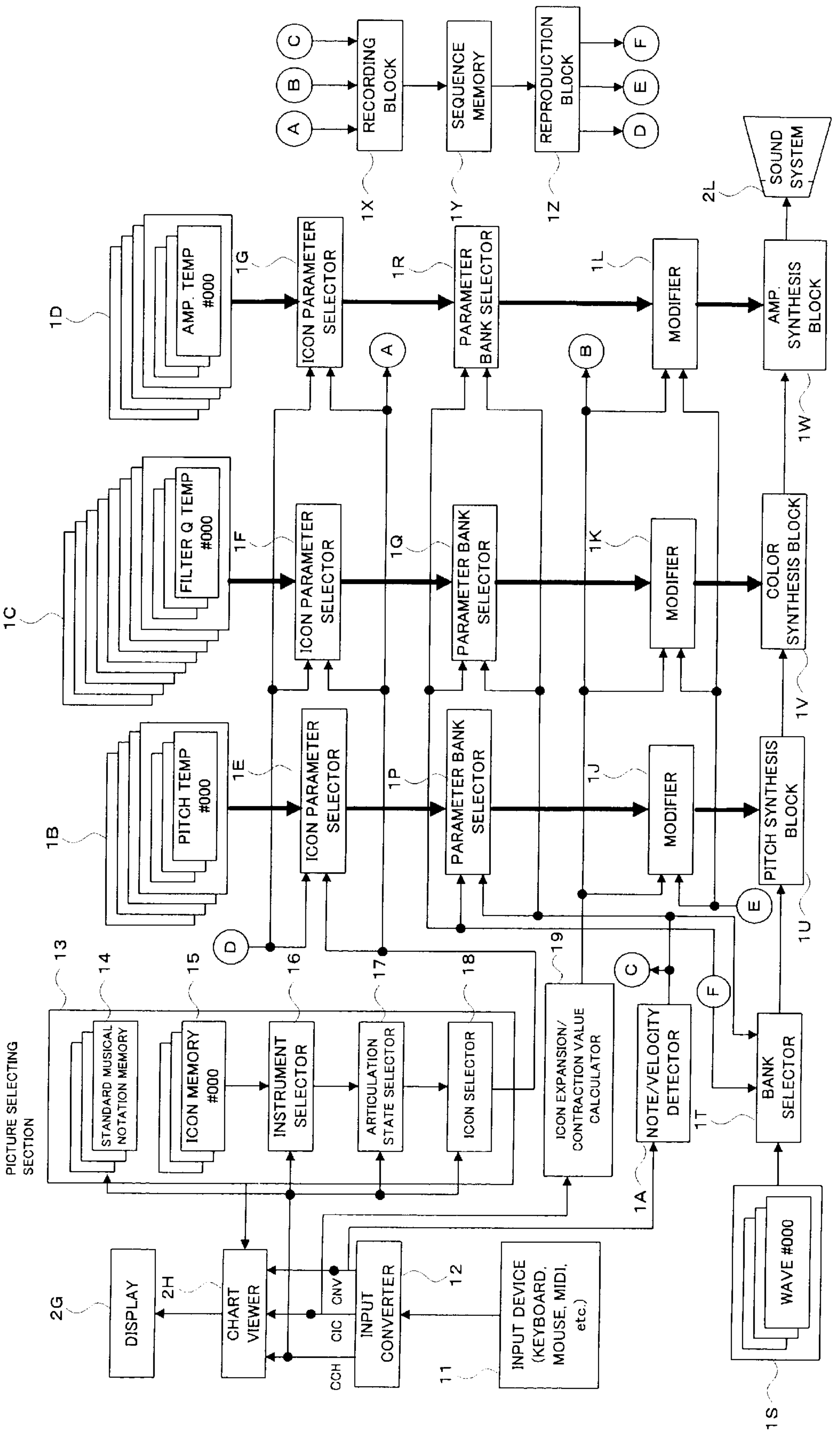
FIG. 1 is a functional block diagram showing how an automatic performance apparatus of the present invention functions as an automatic-performance-control-data input apparatus as a system program pertaining to the inventive automatic-performance-control-data input apparatus is executed in the automatic performance apparatus.

Now, a description will be made about structural arrangements of the automatic-performance-control-data input apparatus of the present invention. FIG. 1 is a detailed functional block diagram showing how the automatic performance apparatus functions as the automatic-performance-control-data input apparatus as the system program pertaining to the inventive automatic-performance-control-data input apparatus is executed in the automatic performance apparatus of FIG. 2. In this figure, all the blocks, other than the blocks of the display 2G, display circuit or chart viewer 2H and sound system 2L, correspond to the functions performed by various components of the automatic performance apparatus shown in FIG. 2. Input section 11 represents the input devices such as the operator unit 26, keyboard 2E and other MIDI equipment 2B of FIG. 2 and outputs signals, more specifically signals corresponding to input operation made by a human operator or user via a mouse pointer, to be fed to an input converter section 12. The input converter section 12 converts the supplied signals from the input section 11 into a screen designating command CCH, icon expansion/contraction value command CIC and note data command CNV. The screen designating command CCH is a signal corresponding to image information which is shown on the display section 2G and pointed to or designated by the mouse pointer, and passed to the display circuit 2H and picture selecting section 13. The icon expansion/contraction value command CIC is a signal corresponding to a modification rate, i.e., expansion/contraction value, of an icon modified in shape on the display section 2G, and passed to the display circuit 2H and icon expansion/contraction value calculator section 19. The note data command CNV is data corresponding to a note which is put on a music staff shown on the display section 2G and designated by the mouse pointer, and passed to the display circuit 2H and note/velocity detector section 1A.

The picture selecting section 13 includes a standard music notation memory 14, an icon image memory 15, an instrument selector 16, an articulation state selector 17 and a style-of-rendition (articulation) icon selector 18. The screen designating command CCH is given to one of the instrument selector 16, state selector 17 and style-of-rendition icon selector 18 within the picture selecting section 13, depending on the sort of the picture information designated by the mouse pointer.

Figure 3:
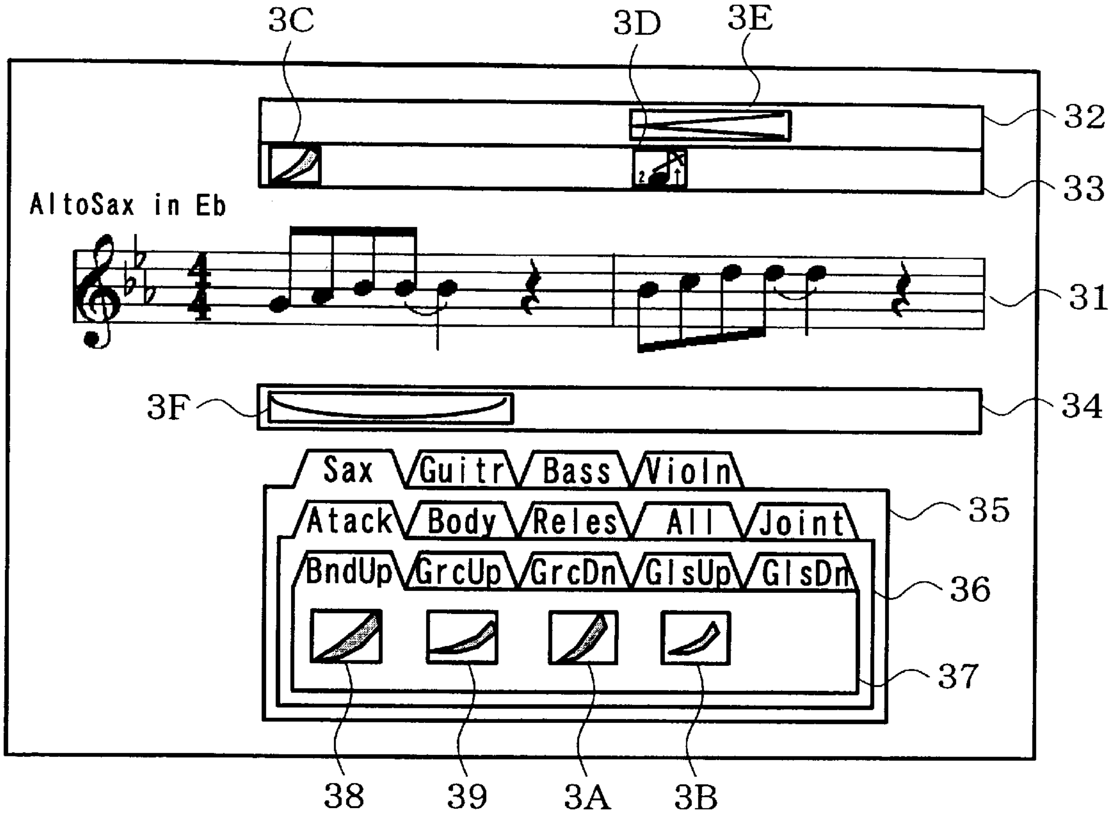
FIG. 3 is a diagram showing an example of a screen presented on a display in response to a screen designating command received by a display circuit in the apparatus of FIG. 2.

Now, a description will be made about how a picture or screen is visually shown on the display section 2G. FIG. 3 shows an example of an picture shown on the display section 2G in response to the screen designating command CCH received by the display circuit 2H. The picture of FIG. 3 is called a “chart”, which is generated by the display circuit or chart viewer 2H. On a music staff 31 of FIG. 3, there are shown automatic performance data for an alto saxophone in E♭ major key. The following paragraphs describe exemplary arrangements for inputting various styles of rendition for the alto saxophone as a representative example of a wind instrument, with reference to FIG. 3. Images of various marks, such as a G clef, key signature (♭), quarter note, eighth note, quarter rest and tie, are generated on the basis of image information stored in the standard music notation memory 14. The music staff 31 is created via the input converter section 12, picture selecting section 13 and display circuit 2H on the basis of automatic performance data, i.e., MIDI data, received via the input section 11 and is then shown on the display section 2G. First to third layers 32–34 are displayed above and below the music staff 31, to which are pasted various style-of-rendition icons added to the performance data being displayed.

The first layer 32 is provided for pasting of style-of-rendition icons representative of styles of rendition each pertaining to or involving a plurality of notes, which, in the preferred embodiment, are crescendo and decrescendo; in the illustrated example of FIG. 3, a crescendo icon has been pasted on the first layer 32.

The second layer 33 are provided for pasting of icons pertaining to changes in tone pitch, volume and color (timbre) of a given note. In the preferred embodiment, the icons to be pasted on the second layer 33 include those representative of styles of rendition, such as bend-up, choking, grace-up (called up-grace in some cases), grace-down (called down-grace in some cases), chromatic-up (called up-chromatic in some cases), chromatic-down (called down-chromatic in some cases), gliss-up (called up-gliss in some cases), gliss-down (called down-gliss in some cases), staccato, detache, vibrato, bend-downup, shortcut, mute and bend-down. Here, the bend-down, grace-up, grace-down and staccato are styles of rendition unique to or peculiar to the saxophone and violin. The mute is a style of rendition peculiar to the violin, guitar and bass. Further, the detache is a style of rendition peculiar to the violin. In the illustrated example of FIG. 3, a "bend-up" icon, representative of a "deep and quick" bend-up rendition, has been pasted on the second layer 33 with respect to or in corresponding relation to a first tone in a first measure and a "grace-up" icon, representative of a "two-tone-up" rendition, has been pasted with respect to a first tone within a second measure.

The third layer 34 is provided for pasting of icons pertaining to combinations of notes, which, in the embodiment, represent a tenuto, slur, hammer-on (or hammering-on), pull-off (or pulling-off), slide-up, slide-down and other renditions. Here, the tenuto and slur are styles of rendition peculiar to the saxophone and violin, and the hammer-on, pull-off, slide-up and slide-down are styles of rendition peculiar to the guitar and bass. In the illustrated example of FIG. 3, a "slur" icon has been pasted on the third layer 34 with respect to all the notes of the first measure.

Further, style-of-rendition icon windows are provided, in a lower portion of the chart of FIG. 3, for imparting articulation to given notes (performance data) on the music staff 31. The outermost style-of-rendition icon window 35 is provided to indicate various types of musical instruments so that a desired one of the instruments can be selected by clicking on a corresponding style-of-rendition tab in the window 35. The preferred embodiment will be described here in relation to a case where articulation is imparted with respect to styles of rendition of four musical instruments, saxophone, guitar (noted as Guitr in the figure), bass and violin (noted as Violn in the figure). Once one of the style-of-rendition tabs is clicked on by the user manipulating the mouse pointer, a screen designating command CCH indicating the musical instrument corresponding to the clicked-on tab is issued from the input converter section 12 to the display circuit 2H and instrument selector 16 of the picture selecting section 13, on the basis of the input signal received via the input section 11. In the illustrated example, a "Sax" tab has been clicked on.

The second or middle style-of-rendition icon window 36 is provided to indicate various segmental states of a tone (i.e., a partial sounding segment or a plurality of notes or connection between notes in the tone) so that a desired one of the states can be selected by clicking on a corresponding state tab in the window 36. In the illustrated example of FIG. 3, five states, attack (noted as "Atack" in the figure), body, release (noted as "Reles" in the figure), all and joint, have been displayed in the second style-of-rendition icon window 36. The "attack", "body" and "release" states correspond to attack, body and release tone-generating phases of a note, and are pasted on the second layer 33. The "all" state affects all of a given plurality of notes and is pasted on the first layer 32. The "joint" state concerns a combination of notes and is pasted on the third layer 34. Once one of the state tabs is clicked on by manipulation the mouse pointer, a screen designating command CCH indicating the state corresponding to the clicked-on tab is issued from the input converter section 12 to the display circuit 2H and state selector 17 of the picture selecting section 13, on the basis of the input signal received via the input section 11. In the illustrated example of FIG. 3, an "attack" tab has been clicked on.

The third or innermost style-of-rendition icon window 37 is provided to indicate various styles of rendition. By clicking on one of style-of-rendition tabs, style-of-rendition icons corresponding to the style of rendition for the selected musical instrument and state are displayed in the window 37 for selection of a desired one of the displayed style-of-rendition icons. In the illustrated example of FIG. 3, five styles of rendition in the attack state: bend-up (noted as "BndUp" in the figure); grace-up (noted as "GrcUp" in the figure); grace-down (noted as "GrcDn"); gliss-up (noted as "GlsUp"); and gliss-down (noted as "GlsDn"), have been displayed. Other styles of rendition, such as chromatic-up, chromatic-down and staccato, can also be selectively input in the preferred embodiment, but illustration of these other styles of rendition is omitted here for simplicity of illustration. Once one of the style-of-rendition tabs is clicked on by manipulation the mouse pointer, a screen designating command CCH indicating the style of rendition corresponding to the clicked-on tab is issued from the input converter section 12 to the display circuit 2H and style-of-rendition icon selector 18 of the picture selecting section 13, on the basis of the input signal received via the input section 11. In the illustrated example of FIG. 3, a "bend-up" tab has been clicked on and thus four different style-of-rendition icons for bend-up 38, 39, 3A and 3B have been displayed to indicate four different combinations of the bend-up depth (deep or shallow) and speed (quick or slow). More specifically, the style-of-rendition icon 38 represents a "deep and slow" bend-up rendition, the icon 39 a "shallow and slow" bend-up rendition, the icon 3A a "deep and quick" bend-up rendition, and the icon 3B a "shallow and quick" bend-up rendition.

In the case where the selected musical instrument is "sax" and the selected state is "attack", there are also other style-of-rendition icons, such as those for the "grace-up", "grace-down", "gliss-up", "gliss-down", "chromatic-up", "chromatic-down" and "staccato" renditions, and the styles of rendition corresponding to these icons can also be selectively input in the preferred embodiment, but illustration of these other style-of-rendition icons is omitted. Description is made below about what kinds of style-of-rendition icons are displayed in the individual states. For the "grace-up" and "grace-down" renditions, six different style-of-rendition icons are displayed in the window 37 which correspond to six combinations of the speed (quick or slow) and the number of tones involved (one, two or three tones). For the "gliss-up" and "gliss-down" renditions, two different style-of-rendition icons are displayed in the window 37 which correspond to two different speeds (quick and slow). For each of the "chromatic-up" and "chromatic-down" renditions, two different style-of-rendition icons are displayed in the window 37 which correspond to two different speeds (quick and slow).

In the case where the selected musical instrument is "sax" and the selected state is "body", two different style-of-rendition tabs for "vibrato" and "bend-up" are displayed in the window 36. For the "vibrato" rendition, 12 different style-of-rendition icons are displayed in the window 37 which correspond to 12 combinations of the depth (deep or shallow), speed (quick or slow) and length of the vibrato. For the "bend-downup" rendition, four different style-of-rendition icons are displayed in the window 37 which correspond to four combinations of the depth (deep or shallow) and speed (quick or slow). If the selected state is "release", six different style-of-rendition tabs for "shortcut", "bend-down", "chromatic-up", "chromatic-down", "gliss-up" and "gliss-down" are displayed in the window 36. For the "shortcut" rendition, two different style-of-rendition icons are displayed in the window 37 which correspond to two different speeds (quick and slow). For the "bend-down", "chromatic-up", "chromatic-down", "gliss-up" and "gliss-down" renditions, the style-of-rendition icons are displayed in the same manner as in the attack state. If the selected state is "all", two different style-of-rendition tabs for "crescendo" and "decrescendo" are displayed in the window 36. For the "crescendo" and "decrescendo" renditions, nine different style-of-rendition icons are displayed in the window 37 which correspond to combinations of the length (crescendo or decrescendo length) and dynamic range (great, medium or small). If the selected state is "joint", two different style-of-rendition tabs for "tenuto" and "slur" are displayed in the window 36. For the "tenuto" rendition, two different style-of-rendition icons are displayed in the window 37 which correspond to two different speeds (quick and slow). For the "slur" rendition, three different style-of-rendition icons are displayed in the window 37 which correspond to normal, bend and grace renditions. FIG. 3 shows only the style-of-rendition icons associated with the case where the selected musical instrument is "sax", the selected state is "attack" and the selected style of rendition is "bend-up"; it should be understood that each time the combination of the selected musical instrument, state and style of rendition is changed, a different set of style-of-rendition icons corresponding to the changed combination is displayed in the embodiment, so that a desired style of rendition can be input by selection of a corresponding one of the displayed icons.

Figure 4:
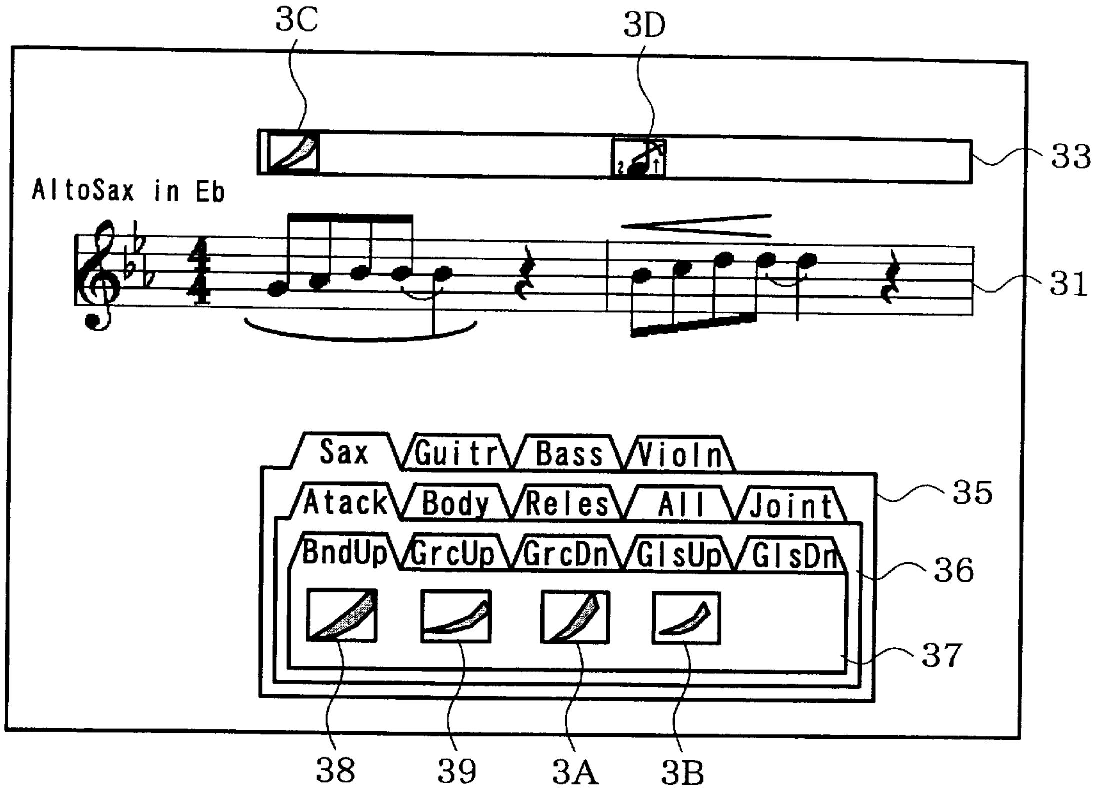
FIG. 4 is a diagram showing a modification of the displayed screen of FIG. 3.

FIG. 4 is a diagram showing a modification of the chart of FIG. 3, which will hereinafter be called a "one layer plus traditional musical notation" chart. In the chart of FIG. 4, the same elements as in the chart of FIG. 3 are denoted by the same reference characters as in FIG. 3 and will not be described here to avoid unnecessary duplication. The chart of FIG. 4 is different from that of FIG. 3 in that the contents of the style-of-rendition icons pasted on the first and third layers 32 and 34 of FIG. 3 are displayed in the chart of FIG. 4 as coupled with the music staff 31 and the chart of FIG. 4 therefore lacks the first and third layers 32 and 34 of FIG. 3. This is because the style-of-rendition icons, such as those of the "crescendo", "decrescendo", "tenuto" and "slur" renditions, pasted on first and third layers 32 and 34 of FIG. 3 can be represented by the traditional musical symbols. Thus, it should be obvious that the style-of-rendition icons pastable on the second layer 33 may also be displayed in the chart of FIG. 4 as coupled with the music staff 31. For example, the styles of rendition corresponding to the "bend-up" icons pasted to the first tone of the first measure, which can not be displayed on the music staff, are displayed on the layer 33 in FIG. 4 as in the chart of FIG. 3, and once a particular "grace-up" icon representative of a two-tone-up rendition is pasted to the first tone of the second measure, the particular "grace-up" icon is displayed as coupled with the music staff. When the "grace-up" icon is displayed as coupled with the music staff like this, it may be displayed in a different color from other musical symbols previously put on the music staff, so as to be readily distinguished from the other musical symbols.

What has been described in the preceding paragraphs is an exemplary arrangement of a GUI (Graphical User Interface) in the case where articulation is to be imparted to the performance data by pasting of a desired style-of-rendition icon using the chart as shown in FIG. 3 or 4. The following paragraphs will describe various processing performed in the preferred embodiment by operation of such a GUI.

Whenever a particular style-of-rendition icon has been selected and pasted on any one of the layers 32–34, the style-of-rendition (or articulation) icon selector 18 outputs the icon number corresponding to the selected icon to icon parameter selectors 1E–1G and recording control section 1X of FIG. 1. In the preferred embodiment, three sets of style-of-rendition parameter are selected by the above-mentioned parameter selectors 1E–1G in response to the selection of the particular style-of-rendition icon. The three sets of style-of-rendition parameters are: pitch parameters pertaining to a tone pitch variation; amplitude parameters pertaining to a tone volume variation; and filter parameters pertaining to a tone color variation. These sets of style-of-rendition parameters (namely, control data or control template data) are prestored in a pitch parameter database 1B, filter parameter database 1C and amplitude parameter database 1D, respectively.

Figure 5:
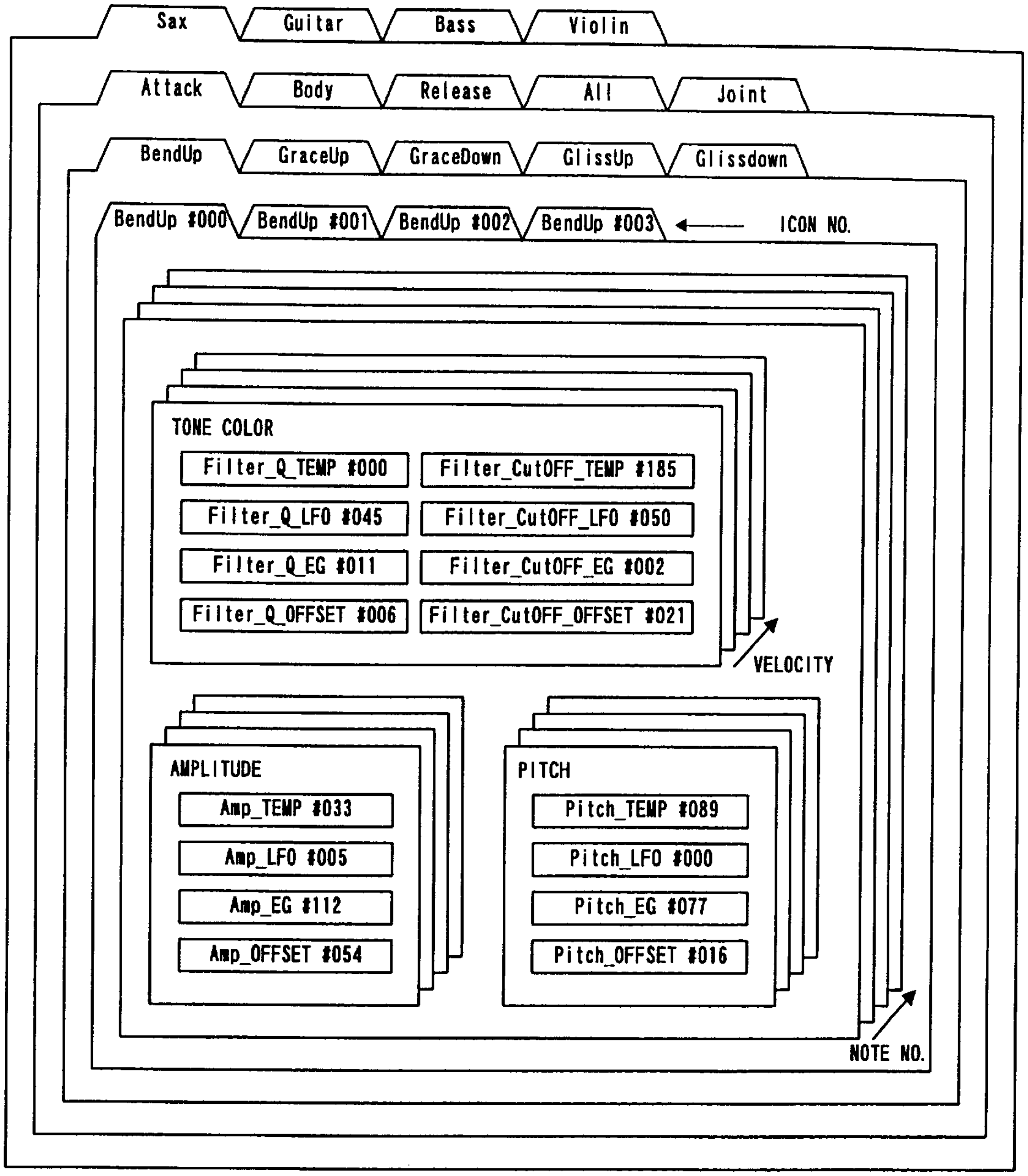
FIG. 5 is a diagram showing an exemplary hierarchical organization of databases of pitch, amplitude and filter parameters employed in the apparatus of FIG. 2.

The parameter databases 1B, 1C and 1D are organized in a hierarchical manner as illustrated in FIG. 5. Specifically, the hierarchical organization is classified in corresponding relation to the windows 35–37 for displaying style-of-rendition icons for articulation impartment and the style-of-rendition icons 38, 39, 3A and 3B shown in FIG. 3. More specifically, the hierarchical organization of FIG. 5 is classified according to the musical instruments, states, styles of rendition and style-of-rendition icons (icon numbers). Here, bend-up parameters (Bendup #000) corresponds to the style-of-rendition icon 38, bend-up parameters (Bendup #001) to the style-of-rendition icon 39, bend-up parameters (Bendup #003) to the style-of-rendition icon 3A, and bend-up parameters (Bendup #004) to the style-of-rendition icon 3B. The bend-up parameters corresponding to each of the above-mentioned style-of-rendition icons are classified according to note numbers, i.e., divided into a plurality of (four in the illustrated example) note number groups. Each of the note number groups is classified according to velocities, i.e., divided or banked into a plurality of (four in the illustrated example) velocity groups. Further, in each of the velocity groups, pointers to actual parameters are stored for each of the pitch, amplitude and filter parameters. More specifically, the pitch parameters include four pointers to a pitch template, pitch low-frequency oscillator (LFO), pitch envelope generator (EG) and pitch offset. Similarly, the amplitude parameters include four pointers to an amplitude template, amplitude low-frequency oscillator (LFO), amplitude envelope generator (EG) and amplitude offset. Further, the filter parameters include eight pointers to a filter Q template, filter Q low-frequency oscillator (LFO), filter Q envelope generator (EG), filter Q offset, filter cutoff template, filter cutoff low-frequency oscillator (LFO), filter cutoff envelope generator (EG) and filter cutoff offset.

Figure 6:
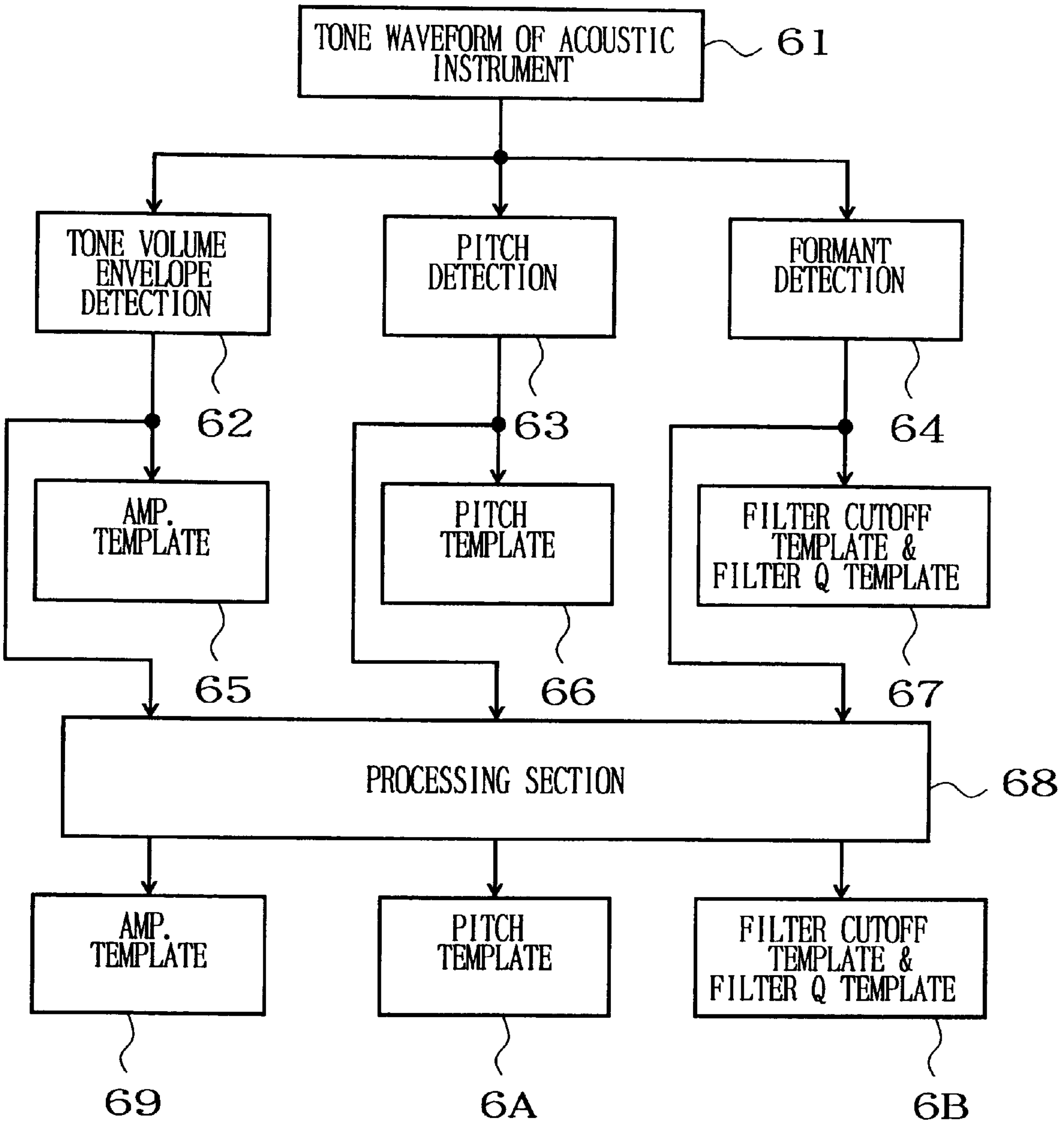
FIG. 6 is a block diagram showing an exemplary structure of a parameter detecting device which creates pitch templates, amplitude templates, filter Q templates, filter cutoff templates, etc. in the apparatus of FIG. 2.

Of the above-mentioned parameters, the pitch template, amplitude template, filter Q template, filter cutoff template etc. are extracted from tone waveforms of an acoustic musical instrument obtained by actually playing the musical instrument. Each of these templates is detected by a parameter detecting device as illustratively shown in FIG. 6. In this parameter detecting device, a tone waveform input section 61 receives, via a microphone or the like, tone waveforms of an acoustic musical instrument actually played in various styles of rendition, and supplies each of the received tone waveforms to volume, pitch and formant detecting sections 62–64. On the basis of the tone waveform supplied, the volume detecting section 62 detects a tone volume variation over time, the pitch detecting section 63 detects a tone pitch variation over time, and the formant detecting section 64 detects a formant variation over time and determines variations in filter cutoff frequency and filter Q on the basis of the detected formant variation. Then, the volume variation, pitch variation, cutoff frequency variation and Q variation thus detected or determined by the respective detecting sections 62–64 are sampled at a predetermined sampling frequency and then stored into corresponding memories 65–67 as amplitude template data, pitch template data, filter cutoff template data and filter Q template data, respectively. These template data are then processed variously via a processing section 68, and the thus-processed results are stored into memories 69, 6A and 6B. These operations are performed for each desired acoustic musical instrument and for each desired style of rendition; even with a same style of rendition, the operations are performed for each different speed and depth. In this manner, the databases 1B, 1C and 1D are built on the basis of the stored contents of the memories 65–67 and 69, 6A and 6B. Note that the databases 1B, 1C and 1D may comprise sequentially-arranged actual parameters and pointers thereto hierarchically organized in the above-mentioned manner, rather than the hierarchically-organized actual parameters as described above.

Figure 7:
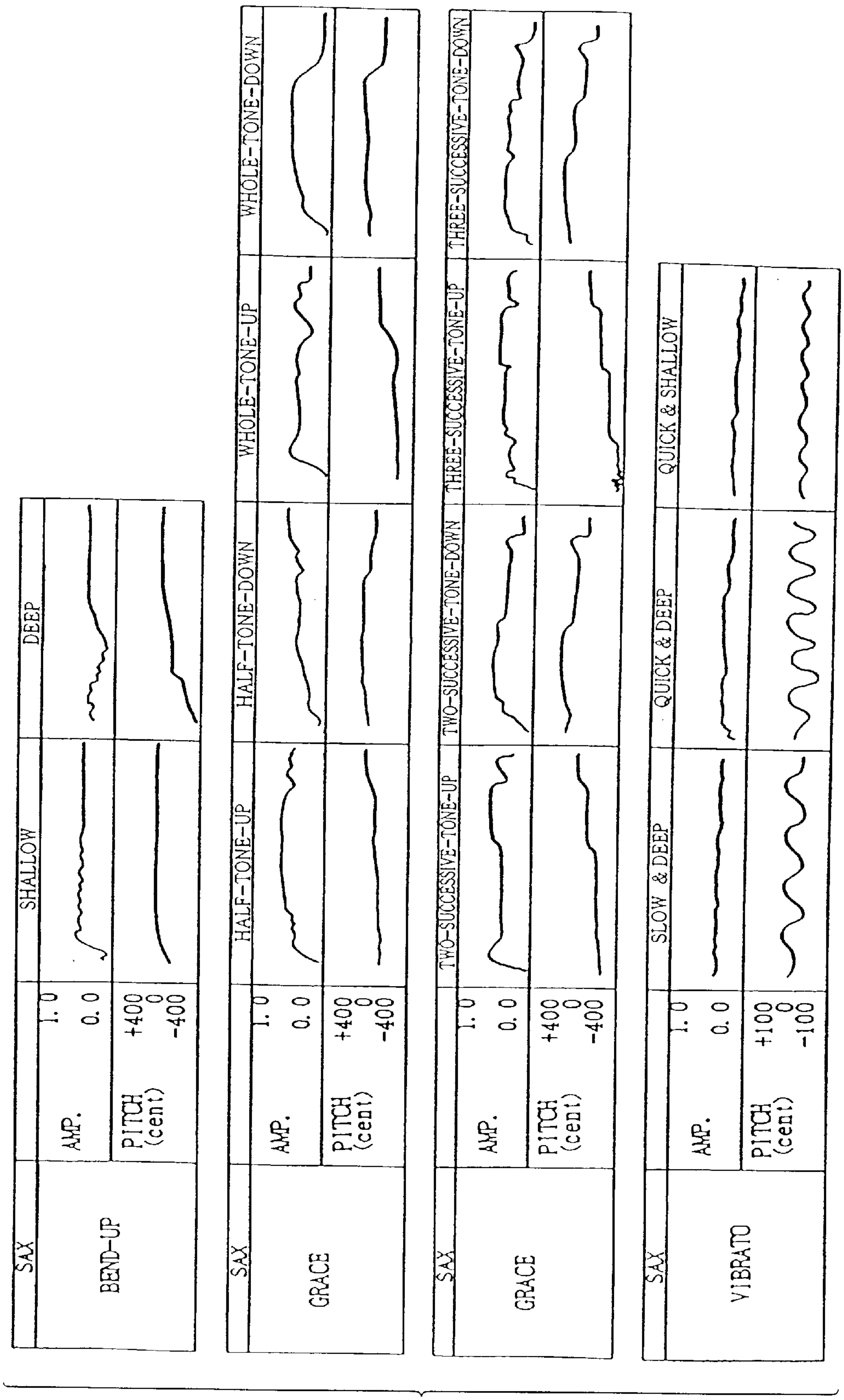
FIG. 7 is a diagram showing exemplary amplitude and pitch waveforms extracted from waveforms of performance tones obtained by actually playing the saxophone in "bend-up", "grace-up" and "vibrato" rendition styles.

FIG. 7 shows exemplary amplitude and pitch waveforms (i.e., waveforms representing time variations of amplitude and pitch, namely, amplitude and pitch envelope waveforms) extracted from waveforms of performance tones obtained by actually playing the saxophone in "bend-up", "grace" and "vibrato" renditions. Regarding the "bend-up", there are shown in FIG. 7 two different waveforms detected of shallow and deep bend-up renditions. Regarding the "grace", there are shown in FIG. 7 eight different waveforms detected of half-tone-up, half-tone-down, whole-tone-up, whole-tone-down, two-successive-tone-up, two-successive-tone-down, three-successive-tone-up and three-successive-tone-down renditions. Regarding the "vibrato", there are shown in FIG. 7 three different waveforms detected of slow and deep, quick and deep and quick and shallow vibrato renditions. Note that illustration of an original waveform from which to determine formant control waveforms (filter Q and filter cutoff frequency) is omitted here because it is difficult to show diagrammatically. Time-serial sample values obtained by sampling such detected waveforms at a predetermined frequency are stored as respective templates (i.e., control data). It should be appreciated that the present invention may employ any other hierarchical organization of the parameters other than the one illustratively shown in FIG. 5. For example, the parameters in each of the style-of-rendition icons may be first classified according to the velocities and then further classified according to the note numbers. Further, the bank-by-by division based on the velocities and note numbers may be placed on a higher level than the musical instrument classification. In another alternative the bank-by-by division may be made in a two-dimensional space of the note number and velocity.

When a particular style-of-rendition icon has been selected and pasted on any one of the layers 32–34 as shown in FIG. 3, the icon parameter selectors 1E–1G select parameter groups, corresponding to the icon number, from the corresponding databases and pass the selected parameter groups to next parameter bank selectors 1P–1R. Also, a note data command CNV pertaining to performance data on the music staff 31, which is influenced by the pasting of the style-of-rendition icon, is fed to a note/velocity detector section 1A. On the basis of the note data command CNV, this note/velocity detector section 1A detects note data and velocity data pertaining to the note and delivers the thus-detected note data and velocity data to the parameter bank selectors 1P–1R, bank selector 1T and recording control section 1X. On the basis of the note data and velocity data from the note/velocity detector section 1A, the parameter bank selectors 1P–1R select, from among the parameter groups corresponding to the icon number, pitch, filter and amplitude parameters belonging to a corresponding velocity group of a corresponding note number group and then output the thus-selected pitch, filter and amplitude parameters to corresponding modifier sections 1J–1L. The bank selector 1T selectively reads out, from a waveform data memory 1S, a waveform memory bank corresponding to the note data and velocity data and then outputs the read-out waveform memory bank to a pitch synthesis section 1U.

By dragging a style-of-rendition icon, pasted on any one of the layers 32–34, at or around its outer frame via the mouse pointer on the displayed screen of FIG. 3, the icon can be modified in shape and size, i.e., expanded or contracted in either one or both of the vertical and horizontal directions. Upon completion of such modification via the mouse pointer, an icon expansion/contraction value command CIC is output to the icon expansion/contraction value calculator section 19. In response to the icon expansion/contraction value command CIC, the icon expansion/contraction value calculator section 19 calculates a rate of the icon modification (i.e., icon expansion/contraction value) and passes the thus-calculated icon expansion/contraction value to the recording control section 1X. The modifier section 1J modifies the value of the pitch parameter on the basis of the icon expansion/contraction value given from the icon expansion/contraction value calculator section 19 and then outputs the modified pitch parameter value to the pitch synthesis section 1U. For instance, when the icon has been expanded or contracted in the vertical direction, the pitch parameter value is increased/decreased, while when the icon has been expanded or contracted in the horizontal direction, the variation rate of the parameter is increased or decreased along the time axial direction. The pitch synthesis section 1U varies, over time, the pitch of waveform data selectively read out from the waveform data memory 1S by the bank selector 1T in accordance with the value of the pitch parameter from the modifier section 1J, and outputs the time-varied pitch to a tone color synthesis section 1V. Modifier section 1K modifies the value of the filter parameter on the basis of the icon expansion/contraction value from the calculator section 19 and outputs the thus-modified filter parameter value to the tone color synthesis section 1V. The tone color synthesis section 1V subjects the waveform data from the pitch synthesis section 1U to a filtering process which uses filter characteristics (tone color) varying over time in accordance with the filter parameters (Q and cutoff frequency of the filter) fed from the modifier section 1K, and outputs the thus-filtered waveform data to an amplitude synthesis section 1W. Further, a modifier section 1L modifies the value of the amplitude parameter on the basis of the icon expansion/contraction value from the calculator section 19 and outputs the thus-modified amplitude parameter value to the amplitude synthesis section 1W. The amplitude synthesis section 1W varies, over time, the tone volume of the waveform data passed from the tone color synthesis section 1V in accordance with the amplitude parameter value from the modifier section 1L, and then outputs the time-varied waveform data to the sound system 2L. This way, in response to the pasting of the style-of-rendition icon, the sound system 2L can sound a note as represented by the pasted icon. Note that the image of each style-of-rendition icon on the display 2G is caused to change by the display circuit 2H in real time on the basis of the icon expansion/contraction value command CIC that is sequentially given from the input converter section 12 in response to movement of the mouse pointer.

Figure 8:
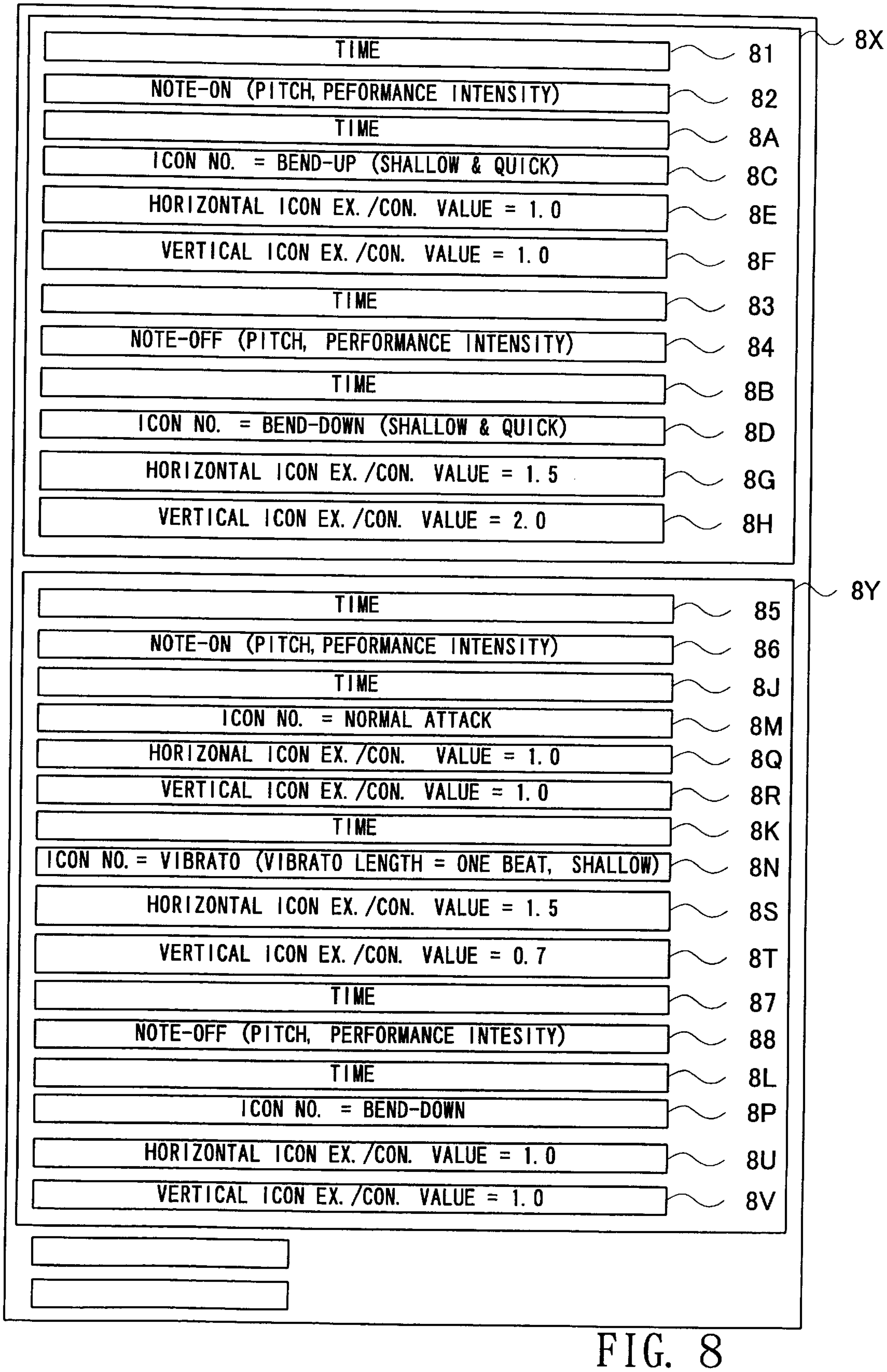
FIG. 8 is a diagram showing an exemplary format of music piece data with style-of-rendition icons imparted thereto.

In response to the pasting of the style-of-rendition icon, the recording control section 1X imparts the content represented by the pasted icon to music piece data and stores the resultant music piece data into a sequence memory 1Y. More specifically, the recording control section 1X receives the icon number from the style-of-rendition icon selector 18, icon expansion/contraction value from the calculator section 19 and note and velocity data from the note/velocity detector section 1A and records, into the music piece data, control data based on these received number, value and data. FIG. 8 is a diagram showing an exemplary format of music piece data having style-of-rendition icons imparted thereto. In the figure, note data 8X pertain to a note in the music piece data and include a pair of duration time (tone generating timing) data 81 and note-on event data 82 and a pair of duration time data 83 and note-off event data 84. Note data 8Y pertain to another note in the music piece data and include a pair of duration time data 85 and note-on event data 86 and a pair of duration time data 87 and note-off event data 88. The note-on event data and note-off event data each represent a tone pitch and performance intensity.

Further, in the illustrated example of FIG. 8, a "shallow and quick bend-up" icon with an unmodified expansion/contraction value is pasted to the attack state segment of the note data 8X. No style-of-rendition icon is pasted to the body segment of the note data 8X. Further, a "shallow and quick bend-down" icon, having an expansion/contraction value modified to "1.5" in the horizontal direction and to "2.0" in the vertical direction, is pasted to the release state segment of the note data 8X. By the pasting of such a "bend-down" icon, the bend-down speed is decreased over an initial speed value by a factor of 1.5 and the bend-down depth is increased over an initial depth value by a factor of 2. By the pasting of these style-of-rendition icons, duration times 8A and 8B, icon numbers 8C and 8D and icon expansion/contraction values 8E–8H are inserted in the note data 8X as shown.

Further, a "normal style of rendition" icon with an unmodified expansion/contraction value is pasted to the attack state segment of the note data 8Y. A "one-beat-length and shallow vibrato" icon, having an expansion/contraction value modified to "1.5" in the horizontal direction and to "0.7" in the vertical direction, is pasted to the body state segment of the note data 8Y. By the pasting of these style-of-rendition icons, the vibrato length is increased over an initial value by a factor of 1.5 and the vibrato depth is decreased over an initial value by a factor of 0.7. Further, a "shallow and quick bend-down" icon with an unmodified expansion/contraction value is pasted to the release state segment of the note data 8Y. By the pasting of these style-of-rendition icons, duration times 8J–8L, icon numbers 8M - 8P and icon expansion/contraction values 8Q–8V are inserted in the note data 8Y as shown. Although no "normal style of rendition" icon is shown as pasted to the attack state segment in FIGS. 3 and 4, such a "normal style of rendition" icon is actually present in each of the attack state, body state and release state segments. By pasting and variously modifying the shape and size of the "normal style of rendition" icon, it is possible to modify the performance condition as desired.

The music piece data having been modified by the pasting of the style-of-rendition icons are recorded sequentially into the sequence memory 1Y. Reproduction section 1Z sequentially reads out the music piece data from the sequence memory 1Y. Thus, the reproduction section 1Z outputs each of the icon numbers to icon parameter selectors 1E–1G, each of the icon expansion/contraction values to the modifier sections 1J–1L and each of the note data and velocity data to the parameter bank selectors 1P–1R and bank selector IT. Thus, a series of the music piece data, sequentially read out from the sequence memory 1Y and having the style-of-rendition icons imparted thereto, will be sequentially sounded in the same manner as when the note corresponding to each of the style-of-rendition icons is sounded as noted above.

Figure 9:
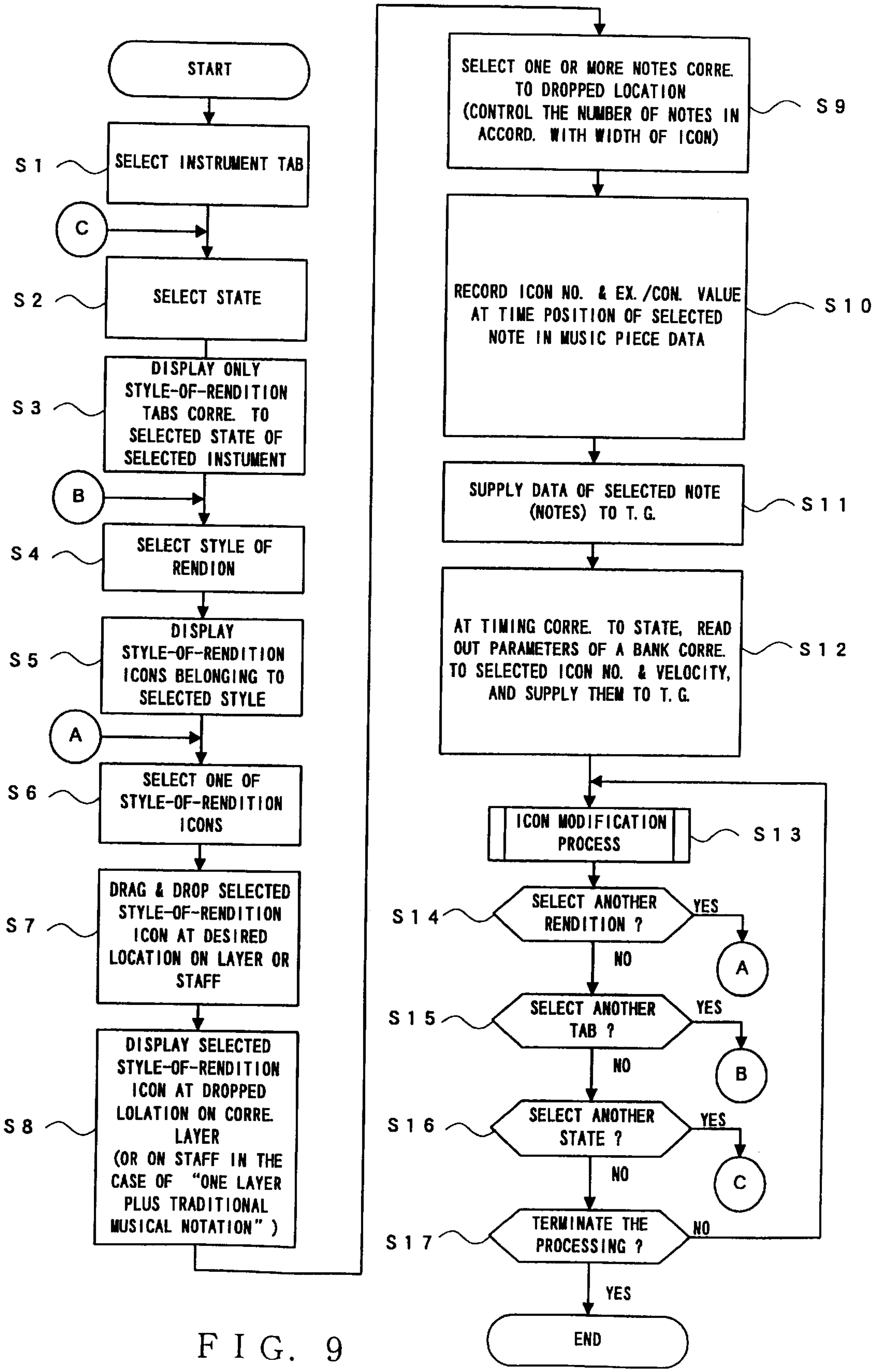
FIG. 9 is a flow chart of various operations performed by the automatic performance apparatus of FIG. 2 when it functions as the automatic-performance-control-data input apparatus.

FIG. 9 is a flow chart of operations performed by the automatic performance apparatus of FIG. 2 when it functions as the automatic-performance-control-data input apparatus. The operations flowcharted here generally correspond to operations taking place when the mouse pointer is manipulated, on the chart of FIG. 3, to drag a style-of-rendition icon to selected note data on the music staff. At first step S1, the "sax" tab is selected in the outermost window 35 via the mouse pointer, because the part to be edited on the music staff is the alto saxophone in the chart of FIG. 3. Then, the second or middle window 36 is displayed for selection of a desired state tab. Now that the musical instrument tab has been selected, the processing flow goes to next step S2 to move the mouse pointer to a desired one of the state tabs and select the desired state tab by clicking thereon. As a consequence, only style-of-rendition tabs belonging to the selected state of the selected musical instrument (saxophone) are displayed in the window 36 at step S3. Namely, in the case of the saxophone, only five style-of-rendition tabs, i.e., "bend-up", "grace-up", "grace-down", "gliss-up" and "gliss-down" tabs, are displayed without the tabs for "choking-up" peculiar to the guitar and bass, "detache" peculiar to the violin, etc. being displayed at all. At following step S4, the mouse pointer is moved to a desired one of the style-of-rendition tabs to select the desired style-of-rendition tab by clicking thereon. Thus, at step S5, one or more style-of-rendition icons belonging to the selected style of rendition are displayed in the innermost window 37. Note that FIG. 3 shows four style-of-rendition icons displayed in the innermost window 37 in the case where the selected musical instrument is "sax", the selected state is "attack" and the selected style of rendition is "bend-up".

At following step S6, the mouse pointer is moved to a desired one of the style-of-rendition icons displayed in the innermost window 37, to thereby select the desired style-of-rendition icon by clicking thereon. The thus-selected style-of-rendition icon can be identified by being put in a different displayed condition (such as a different color) from the other icons. At step S7, the selected style-of-rendition icon is dragged and dropped at a desired location of a desired one of the layers or at a desired note location on the music staff. FIG. 3 shows that the style-of-rendition icon has been dragged and dropped at a location corresponding to the first note of the first measure. Vertical positional relation, to the selected note, of the dropped location of the selected style-of-rendition icon need not necessarily be so accurate as long as the icon generally agrees with the note in the horizontal direction; that is, in the case of FIG. 3, the selected style-of-rendition icon may be dropped on any one of the music staff 31, first to third layers 32–34 and other places, provided that the dropped location is above and below the selected note in approximate vertical alignment therewith.

Once the selected style-of-rendition icon has been dragged and dripped in the above-mentioned manner, the processing flow proceeds to step S8 to display the selected style-of-rendition icon at the dropped location of the layer corresponding to the selected icon. Namely, if the selected style-of-rendition icon pertains to a style of rendition involving a plurality of notes, it is pasted on the first layer 32. If the selected style-of-rendition icon pertains to a variation in tone pitch, volume or color of a tone, it is pasted on the second layer 33. Further, if the selected style-of-rendition icon pertains to a combination of notes, it is pasted on the third layer 34. Thus, for the "bend-up" rendition which belongs to the second layer 33, the style-of-rendition icon 38 is displayed on the second layer 33 as the icon 3C. Note that with respect to the first tone of the second measure in the example of FIG. 3, the "grace-up" icon 3D representative of two-tone-up rendition is displayed on the second layer 33, the "crescendo" icon 3E is displayed on the first layer 32 and the "slur" icon 3F is displayed on the third layer 34. In the "one layer plus traditional musical notation" chart of FIG. 4, the musical symbols corresponding to the style-of-rendition icons of the first and third layers 32 and 34 are displayed on the same level as the music staff 31. Note that in the "one layer plus traditional musical notation" chart of FIG. 4, those style-of-rendition icons capable of being displayed on the same level as the music staff 31 may of course be displayed on the music staff 31 and only other style-of-rendition icons incapable of being displayed on the music staff 31 may be displayed on the second layer 33, without regard to the sorts of the layers.

After that, the processing flow goes to step S9 in order to select one or more of the note data (notes) on the musical staff 31 which correspond to the dropped location of the style-of-rendition icon. Where the selected state is any one of the attack, body and release states, only one note is selected at step S9. However, where the selected state is the all or joint state, one or more note data, corresponding to the horizontal width or beat length of the style-of-rendition icon, are selected at step S9; if the style-of-rendition icon has been modified in shape, then one or more note data, corresponding to the modified beat length, are selected.

Once the style-of-rendition icon and note data whose rendition style is designated by the icon have been determined through the operations of steps S7–S9, the processing flow moves on to step S10, where the icon number and expansion/contraction value are recorded at a location (time position) of the note data corresponding to the note or notes selected from among the music piece data in the manner as shown in FIG. 8. However, in case another icon number of a certain icon incompatible with the currently-selected style-of-rendition icon is already recorded at the same time position, the already-recorded or older icon number and expansion/contraction value are deleted to be replaced by the icon number and expansion/contraction value of the currently-selected style-of-rendition icon. In this case, a warning message that the older style-of-rendition icon is going to be deleted is displayed to seek a judgement of the human operator. Typical examples of such incompatible style-of-rendition icons include those representing renditions of opposite natures such as "crescendo" and "decrescendo" and "gliss-up" and "gliss-down"; even style-of-rendition icons representing a same kind of rendition are considered incompatible if they differ in specific characteristics (such as "shallow", "deep", "quick", "slow" and the number of grace notes involved) and in expansion/contraction value.

At next step S11, the one or more note data selected at step S9 are supplied to the tone generator circuit 2J. Specifically, when note-on event data is supplied, note-off event data is then supplied after a predetermined time interval from the note-on event data. In the case where a plurality of notes have been selected at step S9, a plurality of pairs of the note-on and note-off event data are supplied to the tone generator circuit 2J in accordance with their respective generation timing and order. At next step S12, the style-of-rendition parameters of a particular bank determined by the note number and velocity are read out in corresponding relation to the selected style-of-rendition icon at timing corresponding to the selected state, and the thus-read-out parameters are supplied to various processing components or blocks of the tone generator circuit 2J at one of the following timing: simultaneously with the note-on timing if the selected style-of-rendition icon is of the attack state; in between the note-on and note-off timing so that the time-serial style-of-rendition parameters are located between the note-on and note-off timing, if the selected style-of-rendition icon is of the body state; simultaneously with tone deadening (silencing) timing if the selected style-of-rendition icon is of the release state; and at timing such that the parameters apply to a plurality of the selected notes if the selected style-of-rendition icon is of the all or joint state. Through these operations of steps S11 and S12, the human operator or user is allowed to test-listen to a tone corresponding to the style of rendition represented by the selected style-of-rendition icon.

Next step S13 is directed to an icon modification process routine. If a certain modification is to be made to the rendition as a result of the test-listening, the corresponding style-of-rendition icon can be modified as desired through the icon modification process routine as will be described later with reference to FIG. 10. In case the style-of-rendition icon is to be modified to a relatively great extent as a result of the test-listening, the processing flow of FIG. 9 moves on to step S14 for selection of another style-of-rendition icon, or if a style-of-rendition icon is to be pasted to another note, the same or other suitable style-of-rendition icon is selected at this step S14 for the other note. If another style-of-rendition icon has been selected, the processing flow loops back to step S6 in order to repeat the operations of steps S6–S14. Further, if the style-of-rendition icon is to be modified to an even greater extent as a result of the test-listening, the processing flow proceeds to step S15 in order to select another style-of-rendition tab. Furthermore, in case the user desires to paste another style-of-rendition icon to another note, then another style-of-rendition tab is selected. If another style-of-rendition tab has been selected, the processing flow loops back to step S4 in order to repeat the operations of steps S4–S15. Moreover, if the user desires to paste a style-of-rendition-icon of another state to the same or other note as a result of the test-listening, the processing flow process moves on to step S16 in order to select another state tab. For example, the "body" state is selected to replace the "attack" state. Then, if another state tab has been selected, the processing flow loops back to step S2 in order to repeat the operations of steps S2–S16. If the series of the operations is to be terminated, the processing flow is terminated at step S17.

Figure 10:
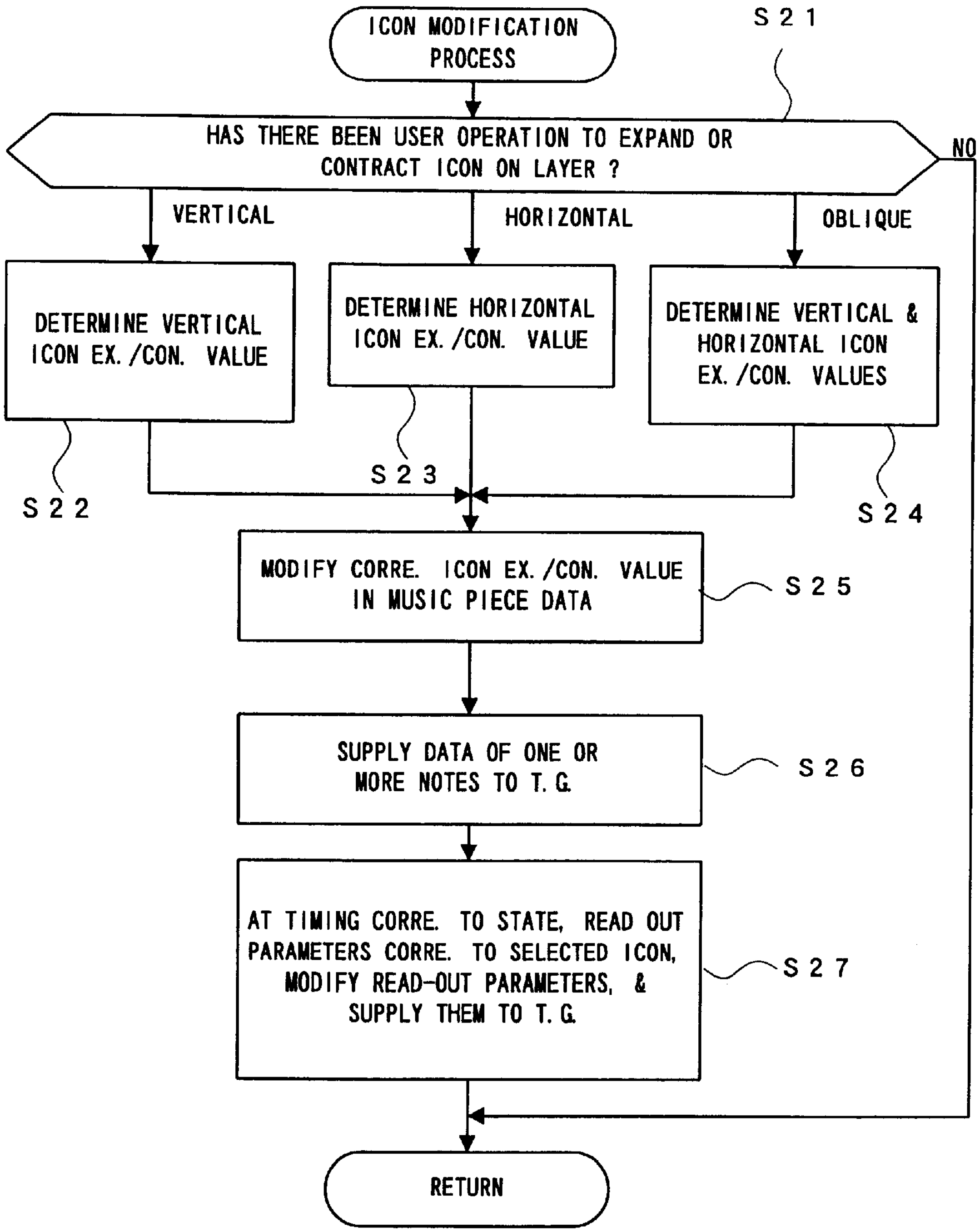
FIG. 10 is a flow chart showing an example of an icon modification process of FIG. 9.

FIG. 10 is a flow chart showing an example of the icon modification process of FIG. 9. In this icon modification process routine, it is first determined at step S21 whether or not a user operation has been made to expand or contract any one of the style-of-rendition icons displayed on the layers. If no such user operation has been made, the icon modification process routine is terminated immediately without performing any other operation. If, on the other hand, such a user operation has made as determined at step S21, then a specific type of the user operation in question is identified and one of steps S22–S24 is taken depending on the identified type of the user operation. When the style-of-rendition icon is clicked on at its upper or lower end and dragged in the vertical direction by the user via the mouse pointer, step S22 is taken so that the icon is expanded or contracted in the vertical direction. When the style-of-rendition icon is clicked on at its left or right end and dragged in the horizontal direction by the user, step S23 is taken so that the icon is expanded or contracted in the horizontal direction. Further, when the style-of-rendition icon is clicked on at one of its corners and dragged vertically and horizontally (obliquely) by the user, step S24 is taken so that the icon is expanded or contracted simultaneously in both of the vertical and horizontal directions. In the event that the style-of-rendition icon is clicked on at one of its corners and dragged in either one of the vertical and horizontal direction, the processing flow may either go to step S22 or S23 depending on the drag direction, or go directly to step S24.

Icon expansion or contraction value in the vertical direction is determined at step S22. Similarly, an icon expansion or contraction value in the horizontal direction is determined at step S23. Further, an icon expansion or contraction values in each of the vertical and horizontal directions is determined at step S24. Upon completion of the expansion/contraction value determining operation at any one of steps S22–S24, the icon modification process moves on to step S25 in order to modify a corresponding icon expansion/contraction value included in the performance data, and then proceeds to steps S26 and S27. At step S26, the one or more notes selected at step S9 are supplied to the tone generator circuit 2J. Note-on event data is first supplied, and then note-off event data is supplied after a predetermined time interval from the note-on event data. In the case where a plurality of notes have been selected at step S9, a plurality of pairs of the note-on and note-off event data are supplied to the tone generator circuit 2J in accordance with their respective generation timing and order. Then, at step S27, the style-of-rendition parameters of a particular bank determined by the note number(s) and velocity (velocities) are read out in corresponding relation to the selected style-of-rendition icon at timing corresponding to the selected state, and the read-out parameters are modified in accordance with the icon expansion/contraction value determined at one of steps S22–S24. The thus-modified style-of-rendition parameters are supplied to the various processing components or blocks of the tone generator circuit 2J at the same timing as at step S12. Through these operations of steps S26 and S27, the human operator or user is allowed to test-listen to a tone corresponding to the modified style-of-rendition icon.

The preceding paragraphs have described exemplary manners in which control data corresponding selectable styles of rendition are input and music performances are executed on the basis of such control data, in relation to the alto saxophone. However, the basic principles of the present invention can also be applied to inputting of various styles of rendition pertaining to other types of natural musical instruments and performances based on the thus-input styles of rendition. However, the kinds of the styles of rendition that can be input differ among various natural musical instruments, as will be described below.

Figure 11:
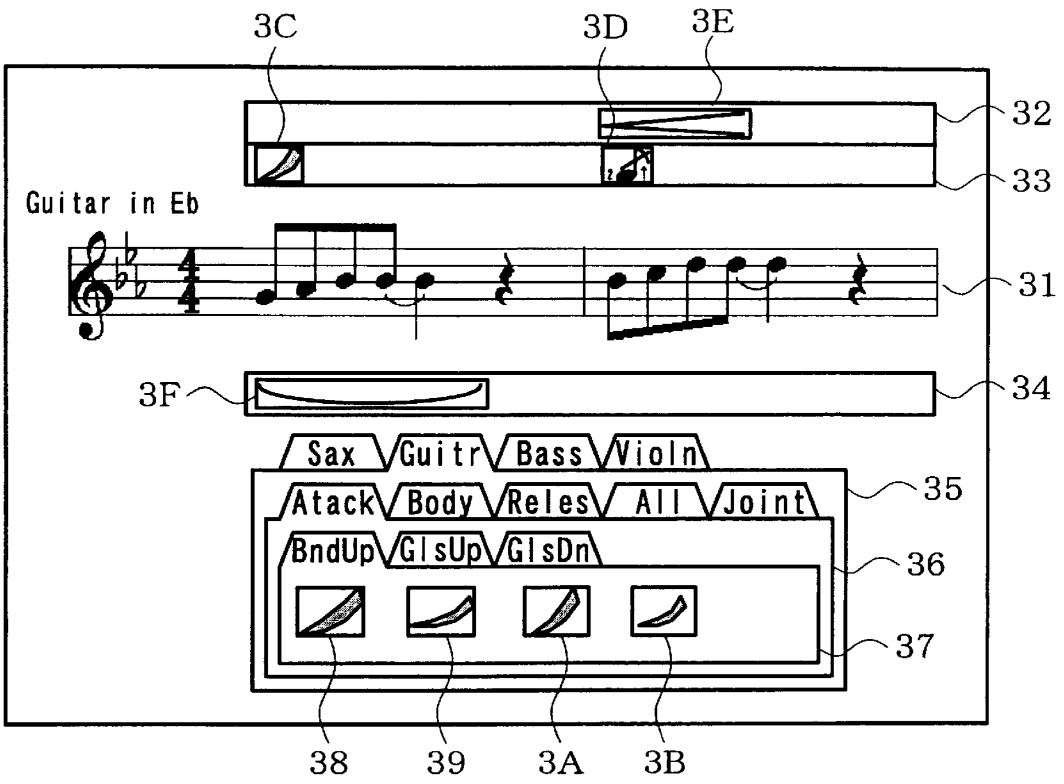
FIG. 11 is a diagram showing a modification of the displayed screen of FIG. 3.

FIG. 11 is a diagram showing a displayed screen, similar to that of FIG. 3, in relation to a case where "guitar" has been selected as a representative example of rubbed stringed instruments. Thus, in FIG. 11, a style-of-rendition inputting window for "guitar" has been opened as the first window 35 by clicking of the "guitar" tab. The second window 36, used to selectively input a state of a tone for which a desired style of rendition is to be input (i.e., a partial sounding segment or a plurality of notes or connection between notes in the tone), is similar to that of FIG. 3. Although the "attack" tab has been clicked on in FIG. 11 too, the styles of rendition selectable via the third window 37 in relation to the "attack" state are slightly different from those shown in FIG. 3. Namely, the displayed screen of FIG. 11 indicates that any one of three styles of rendition, "bend-up (BndUp)", "gliss-up (Glsup)" and "gliss-down (GlsDn)", is selectable for the "attack" state of "guitar". In FIG. 11, the "bend-up" tab has been clicked on as in the illustrated example of FIG. 3.

Although not specifically shown in the figure, various styles of rendition selectable for the other states are as follows. In the case where the selected musical instrument is "guitar" and the selected state is "body", two different styles of rendition, "vibrato" and "bend-up", are displayed in the window 36. For the "vibrato" rendition, 12 different style-of-rendition icons are displayed in the window 37 which correspond to 12 combinations of the depth (deep or shallow), speed (quick or slow) and length of the vibrato. For the "bend-downup" rendition, four different style-of-rendition icons are displayed in the window 37 which correspond to combinations of the depth (deep or shallow) and speed (quick or slow). If the selected state is "release", six different style-of-rendition tabs for "shortcut", "mute", "chromatic-up", "chromatic-down", "gliss-up" and "gliss-down" are displayed in the window 36, and two different style-of-rendition icons are displayed in the window 37 which correspond to two different speeds (quick and slow). If the selected state is "all", two different style-of-rendition tabs for "crescendo" and "decrescendo" are displayed in the window 36. For these "crescendo" and "decrescendo" renditions, nine different style-of-rendition icons are displayed in the window 37 which correspond to nine combinations of the length (crescendo or decrescendo length) and dynamic range (great, medium or small). If the selected state is "joint", four different style-of-rendition tabs for "hammer-on", "pulloff", "slide-up" and "slide-down" are displayed in the window 36. For these renditions, four different style-of-rendition icons are displayed in the window 37 which correspond to combinations of the speed (quick or slow) and tone pitch. FIG. 11 shows only the style-of-rendition icons in the case where the selected musical instrument is "guitar", the selected state is "attack" and the selected style of rendition is "bend-up"; it should be understood that each time the combination of the selected musical instrument, state and style of rendition is changed, a different set of style of style-of-rendition icons corresponding to the changed combination is displayed in the embodiment.

Figure 12:
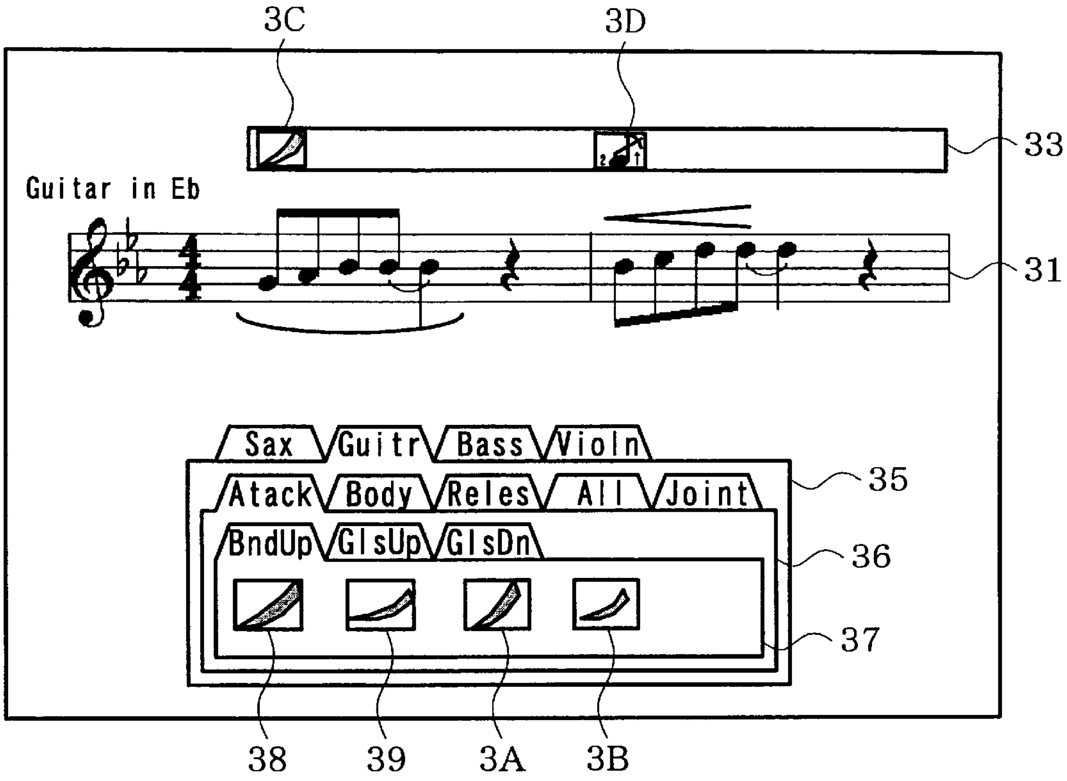
FIG. 12 is a diagram showing a modification of the screen of FIG. 11.

FIG. 12 is a diagram showing a modification of the chart of FIG. 11, which is therefore a "one layer plus traditional musical notation" chart. In the chart of FIG. 12, the same elements as in the chart of FIG. 11 are denoted by the same reference characters as in FIG. 11 and will not be described and illustrated here to avoid unnecessary duplication.

Figure 13:
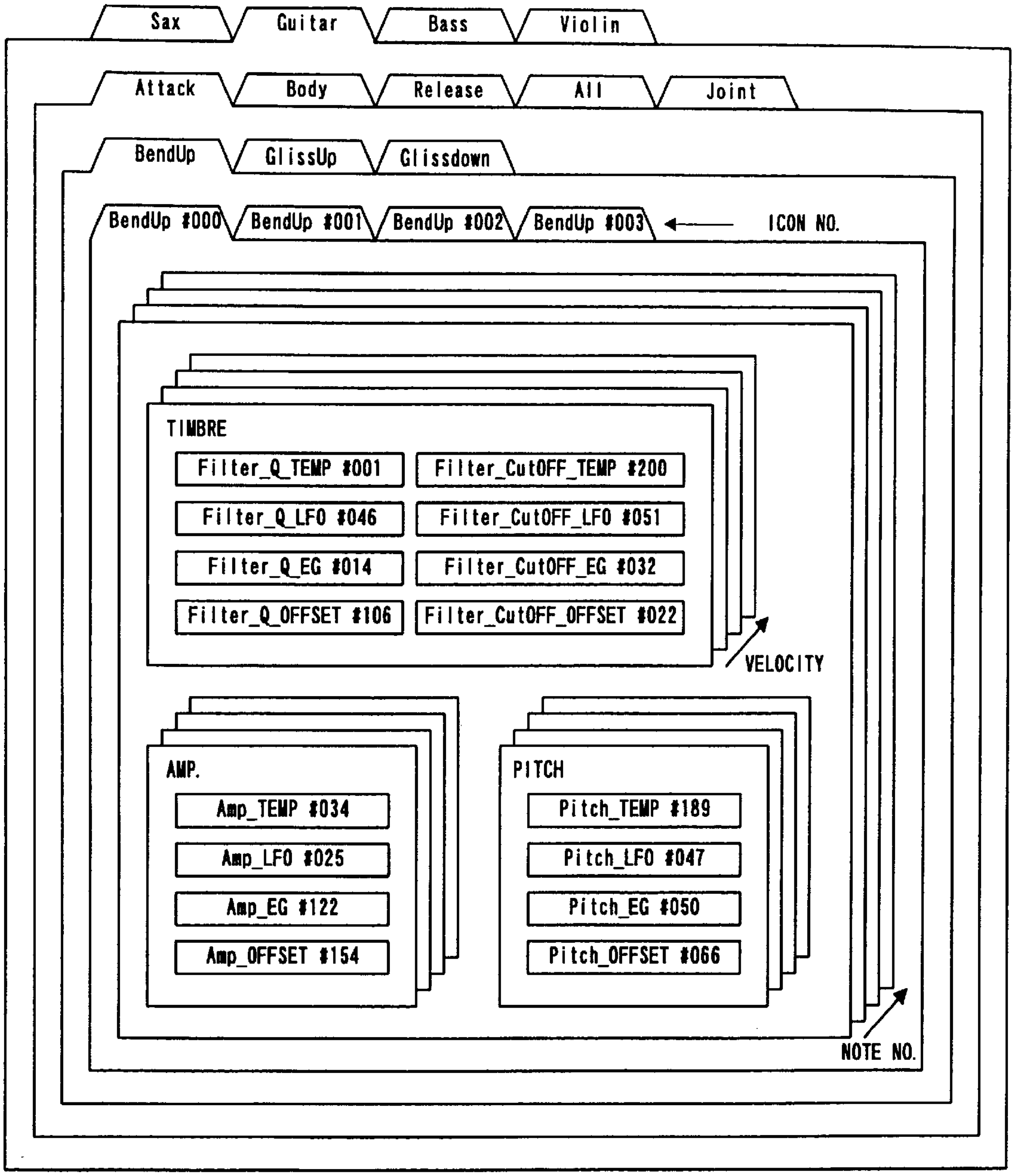
FIG. 13 is a diagram showing an exemplary hierarchical organization of databases corresponding to the screens of FIGS. 11 and 12.

FIG. 13 is a diagram showing a hierarchical organization of parameter databases 1B, 1C and 1D similar to that of FIG. 5, which shows a condition where the parameter databases 1B, 1C and ID have been opened for an icon number "#000" pertaining to the "bend-up" rendition in the attack state of "guitar". In the preferred embodiment, some of the icon numbers are shared among different musical instruments to facilitate a selecting operation by the user; however, even with a same style-of-rendition icon (i.e., icon number), the parameters read out from the databases differ in content among the instruments. But, to save a memory space for the databases, some of the parameters or control templates may be shared among different musical instruments.

Figure 14:
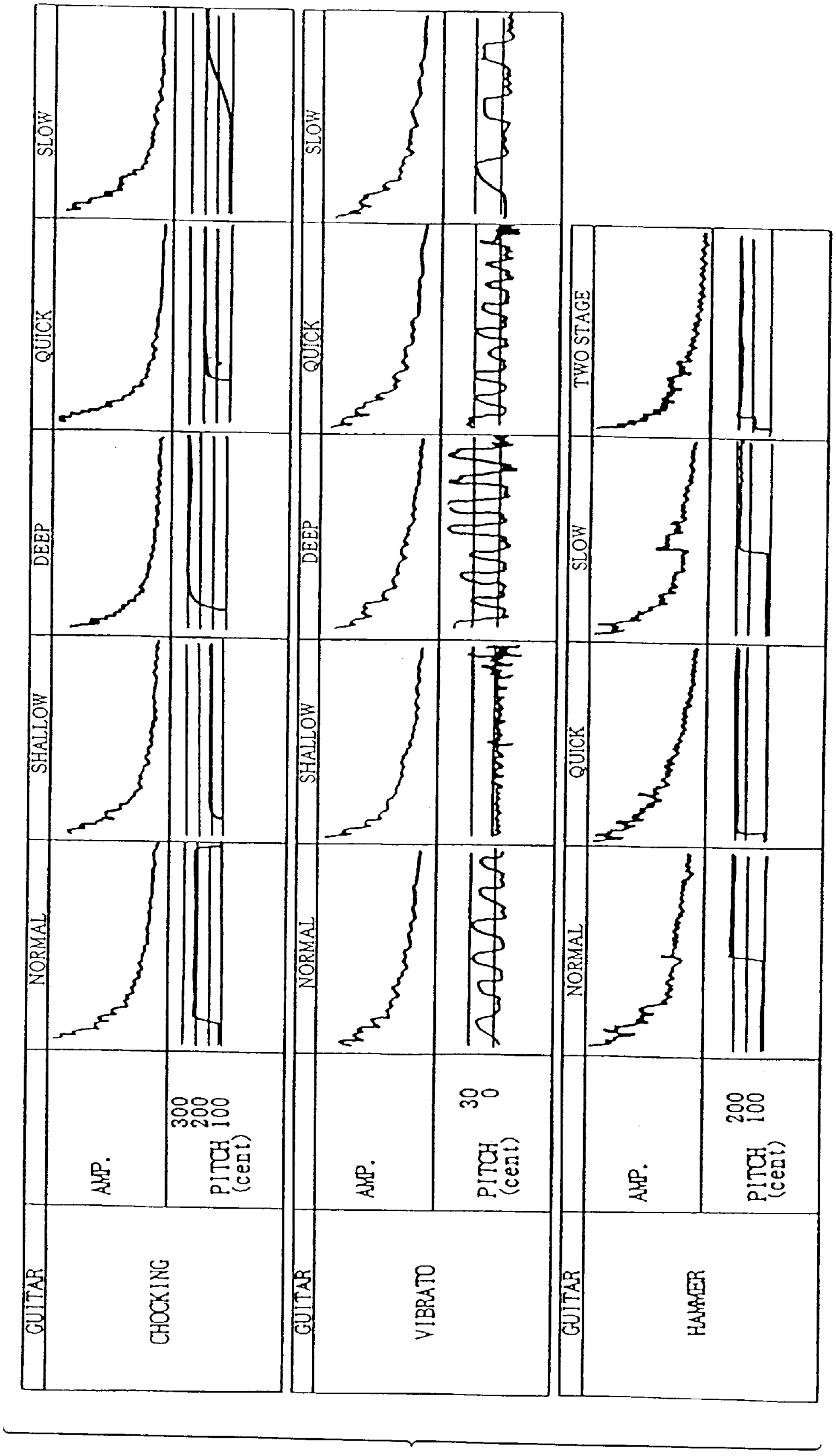
FIG. 14 is a diagram showing exemplary amplitude and pitch waveforms extracted from waveforms of performance tones obtained by actually playing the guitar in "bend-up (choking)", "vibrato" and "hammer-on" rendition styles.

FIG. 14 illustratively shows various rendition controlling parameters for guitar which are prestored in the databases. More specifically, FIG. 14 shows amplitude and pitch waveforms (i.e., waveforms representing time variations of amplitude and pitch, namely, amplitude and pitch envelope waveforms) extracted from actual waveforms of performance tones obtained by actually playing the guitar in "choking" (bend-up or bend-down), "vibrato" and "hammer-on" rendition styles. Regarding the "choking", there are shown in FIG. 14 five different waveforms detected of normal, shallow, deep, quick and slow choking renditions. Regarding the "vibrato", there are shown in FIG. 14 five different waveforms detected of normal, shallow, deep, quick and slow vibrato renditions. Regarding the "hammer-on", there are shown in FIG. 14 four different waveforms detected of normal, quick and slow vibrato renditions and a rendition involving a two-stage tone variation. Note that illustration of an original waveform from which to determine formant control waveforms (filter Q and filter cutoff frequency) is omitted here because it is difficult to show in diagrammatic form. Time-serial sample values obtained by sampling such detected waveforms at a predetermined frequency are stored in the databases as the respective templates of control data.

Figure 15:
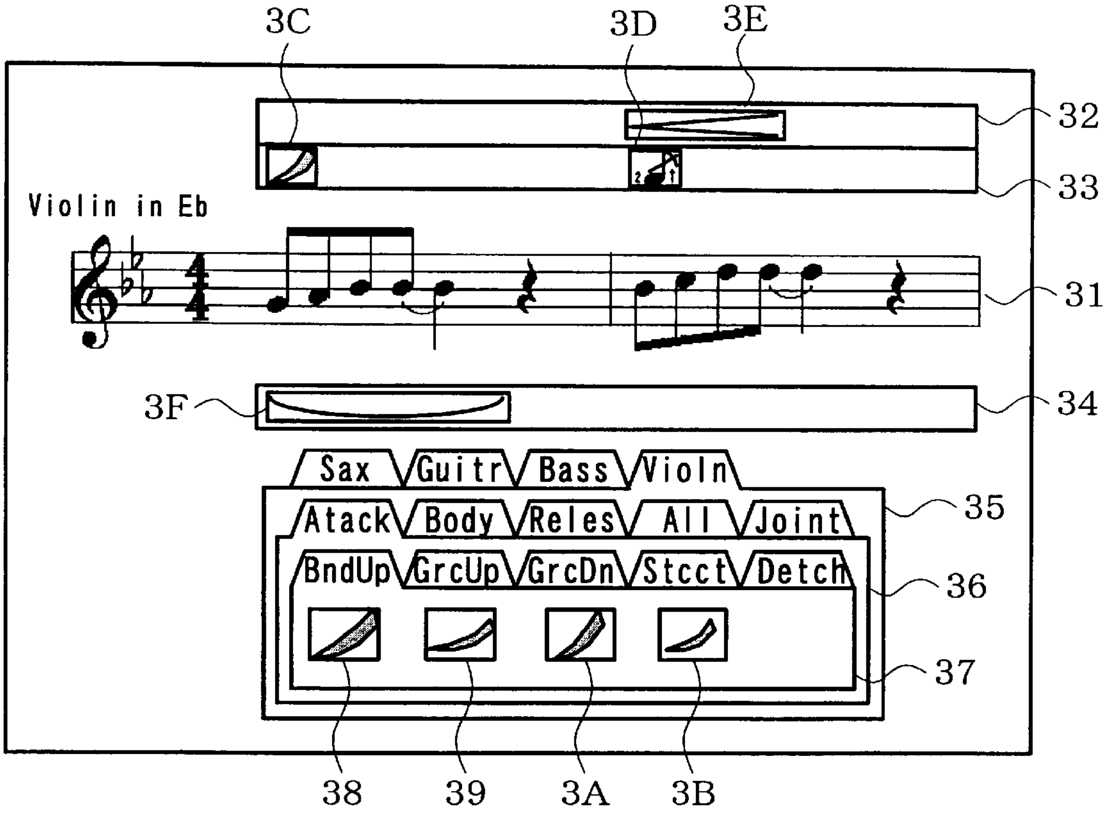
FIG. 15 is a diagram showing another modification of the displayed screen.

Further, FIG. 15 is a diagram showing a displayed screen, similar to those of FIGS. 3 and 11, in relation to the case where "violin" has been selected as a representative example of rubbed stringed instruments. Thus, in FIG. 15, a style-of-rendition inputting window for "violin" has been opened as the first window 35 by clicking of the "violin" tab. The second window 36, used to selectively input a state of a tone for which a desired style of rendition is to be input (i.e., a partial sounding segment or a plurality of notes or connection between notes in the tone), is similar to those of FIGS. 3 and 11. Although the "attack" tab has been clicked on in FIG. 15 too, the styles of rendition selectable via the third window 37 in relation to the "attack" state are slightly different from those shown in FIGS. 3 and 11. Namely, the displayed screen of FIG. 15 indicates that any one of five styles of rendition, "bend-up (BndUp)", "grace-up (GrcUp) ", "grace-down (GrcDn)", "staccato (Stcct)" and "detache (Detch)" is selectable. In FIG. 15, the "bend-up" tab has been clicked on as in the illustrated examples of FIGS. 3 and 11.

In the case where the selected musical instrument is "violin" and the selected state is "attack", there are also other style-of-rendition icons than the bend-up icons, such as those for the "grace-up", "grace-down", "staccato" and "detache" renditions, and the styles of rendition corresponding to these icons can also be selectively input in the preferred embodiment, but illustration of these other style-of-rendition icons is omitted for simplicity of illustration. Description is made below about what kinds of style-of-rendition icons are displayed in the individual states. For each of the "grace-up" and "grace-down" renditions, six different style-of-rendition icons are displayed in the window 37 which correspond to six combinations of the speed (quick or slow) and the number of tones involved (one, two or three tones). For the "staccato" rendition, two different style-of-rendition icons are displayed in the window 37 which correspond to normal and tenuto renditions. In the case where the selected musical instrument is "violin" and the selected state is "body", two different style-of-rendition tabs for "vibrato" and "bend-up" are displayed in the window 36. For the "vibrato" rendition, 12 different style-of-rendition icons are displayed in the window 37 which correspond to 12 combinations of the depth (deep or shallow), speed (quick or slow) and length of the vibrato. For the "bend-downup" rendition, four different style-of-rendition icons are displayed in the window 37 which correspond to combinations of the depth (deep or shallow) and speed (quick or slow). If the selected state is "release", seven different style-of-rendition tabs for "shortcut", "mute", "bend-down", "chromatic-up", "chromatic-down", "gliss-up" and "gliss-down" are displayed in the window 36, and two different style-of-rendition icons are displayed in the window 37 which correspond to two different speeds (quick and slow). For the "mute" rendition, two different style-of-rendition icons are displayed in the window 37 which correspond to two different speeds (quick and slow). For the "bend-down" rendition, the style-of-rendition icons are displayed in the same manner as in the attack state. Further, for the "gliss-up" and "gliss-down" renditions, two different style-of-rendition icons are displayed in the window 37 which correspond to two different speeds (quick and slow). For the "chromatic-up" and "chromatic-down" renditions, two different style-of-rendition icons are displayed in the window 37 which correspond to two different speeds (quick and slow). If the selected state is "all", two different style-of-rendition tabs for "crescendo" and "decrescendo" are displayed in the window 36. For the "crescendo" and "decrescendo" renditions, nine different style-of-rendition icons are displayed in the window 37 which correspond to combinations of the length (crescendo or decrescendo length) and dynamic range (great, medium or small). If the selected state is "joint", two different style-of-rendition tabs for "tenuto" and "slur" are displayed in the window 36. For the "tenuto" rendition, two different style-of-rendition icons are displayed in the window 37 which correspond to two different speeds (quick and slow). For the "slur" rendition, three different style-of-rendition icons are displayed in the window 37 which correspond to normal, bend and grace rendition styles. FIG. 15 shows only the style-of-rendition icons associated with the case where the selected musical instrument is "violin", the selected state is "attack" and the selected style of rendition is "bend-up"; however, it should be understood that as the combination of the selected musical instrument, state and style of rendition is changed, another set of style-of-rendition icons corresponding to the changed combination is displayed in the embodiment.

Figure 16:
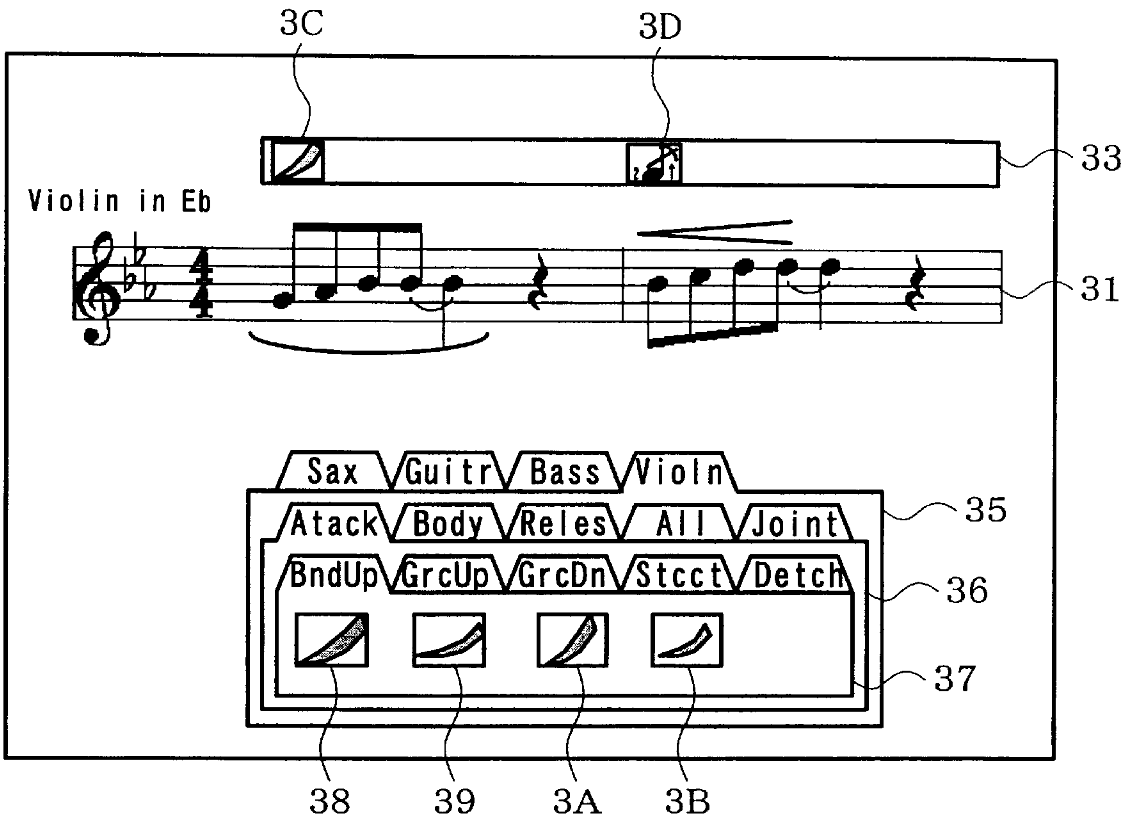
FIG. 16 is a diagram showing a modification of the displayed screen of FIG. 15.

FIG. 16 is a diagram showing a modification of the chart of FIG. 15, which is therefore a "one layer plus traditional musical notation" chart. In the chart of FIG. 16, the same elements as in the chart of FIG. 15 are denoted by the same reference characters as in FIG. 15 and will not be described and illustrated here to avoid unnecessary duplication.

Figure 17:
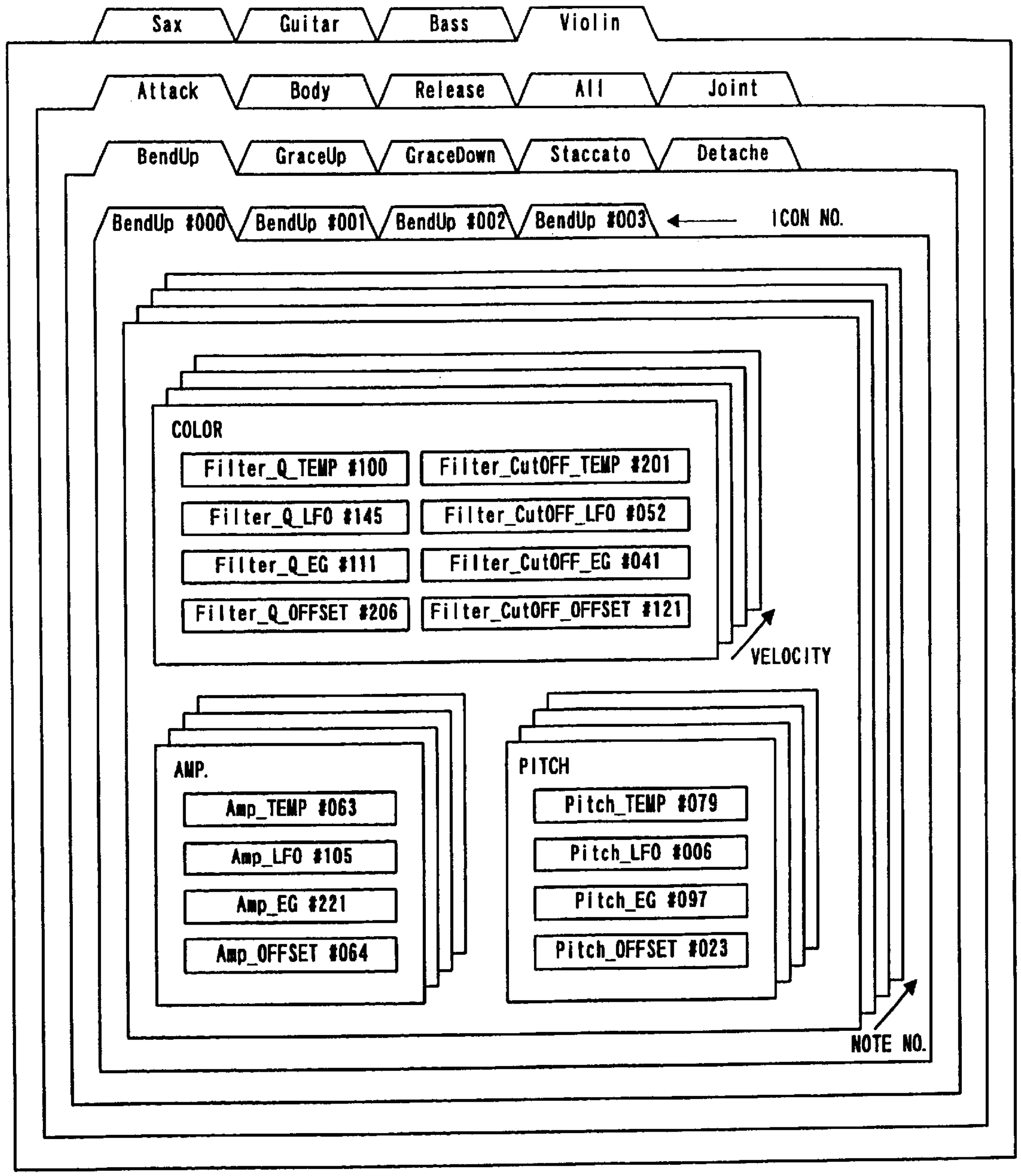
FIG. 17 is a diagram showing an exemplary hierarchical organization of databases corresponding to the screens of FIGS. 15 and 16.

FIG. 17 is a diagram showing a hierarchical organization of parameter databases 1B, 1C and 1D similar to that of FIG. 5 or 13, which shows a condition where the parameter databases 1B, 1C and 1D have been opened for an icon number "#000" pertaining to the "bend-up" rendition in the attack state of "violin". As previously mentioned, some of the icon numbers are shared among different musical instruments; however, even with a same style-of-rendition icon (i.e., icon number), the parameters read out from the databases differ in content among the musical instruments.

Figure 18:
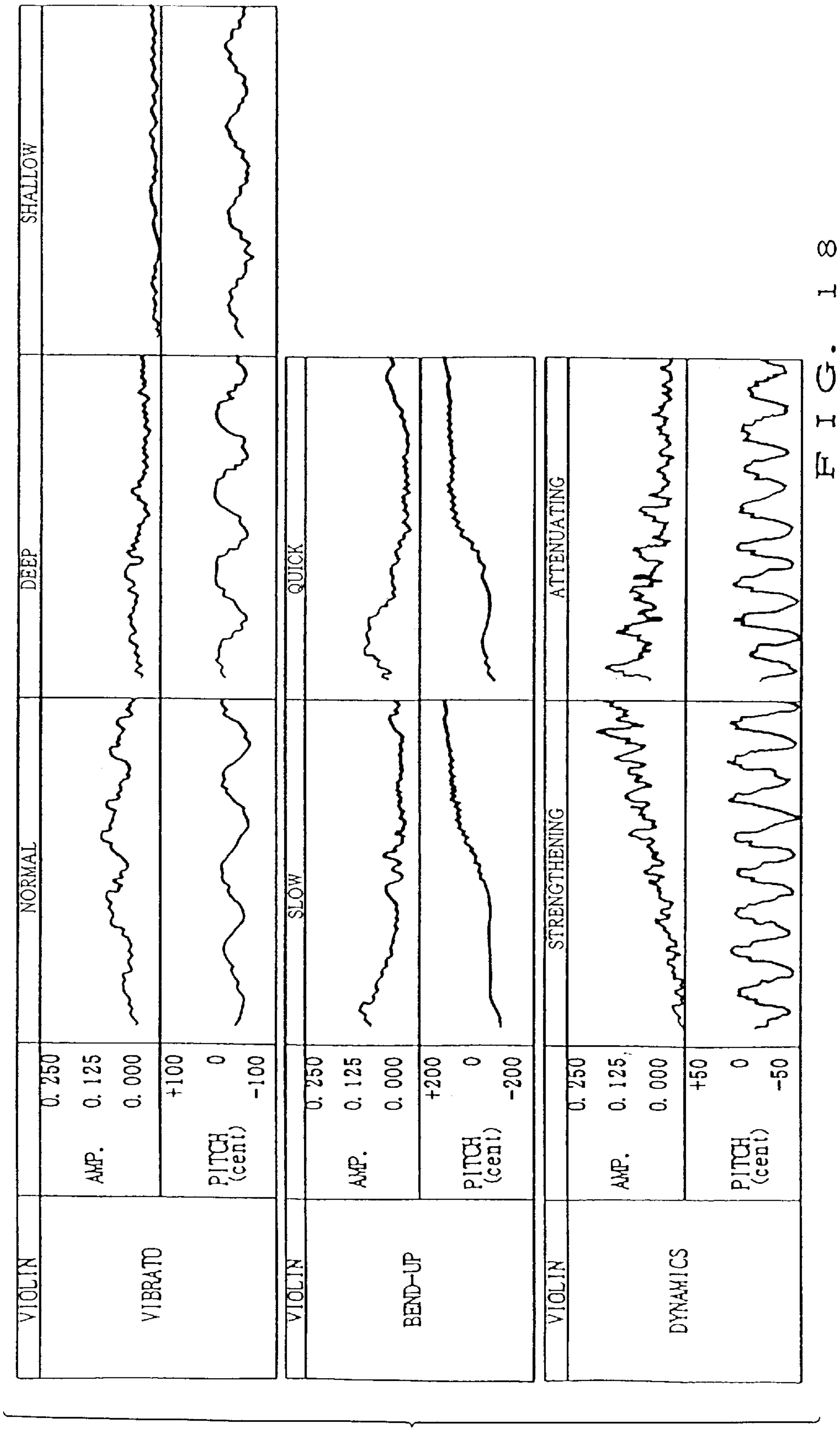
FIG. 18 is a diagram showing exemplary amplitude and pitch waveforms extracted from waveforms of performance tones obtained by actually playing the violin in "vibrato", "bend-up" and "dynamics" rendition styles.

Further, FIG. 18 illustratively shows various rendition controlling parameters for violin which are prestored in the databases. More specifically, FIG. 18 shows amplitude and pitch waveforms (i.e., waveforms representing time variations of amplitude and pitch, namely, amplitude and pitch envelope waveforms) extracted from actual waveforms of performance tones obtained by actually playing the violin in "vibrato", "bend-up" and "dynamics" rendition styles. Regarding the "vibrato", there are shown in FIG. 18 three different waveforms detected of normal, deep and shallow renditions. Regarding the "bend-up", there are shown in FIG. 18 two different waveforms detected of quick and slow vibrato renditions. Regarding the "dynamics", there are shown in FIG. 14 two different waveforms detected of strengthening and attenuating renditions. Note that illustration of an original waveform from which to determine formant control waveforms (filter Q and filter cutoff frequency) is omitted here because it is difficult to show in diagrammatic form. Time-serial sample values obtained by sampling such detected waveforms at a predetermined frequency are stored in the databases as the respective templates.

It should be appreciated that the music piece data may include data of a plurality of tracks in a mixed fashion. Further, the music piece data may be in any desired format, such as: the "event plus absolute time" format where the time of occurrence of each performance event is represented by an absolute time within the music piece or a measure thereof; the "event plus relative time" format where the time of occurrence of each performance event is represented by a time interval from the immediately preceding event; the "pitch (rest) plus note length" format where each performance data is represented by a pitch and length of a note or a rest and a length of the rest; or the "solid" format where a memory region is reserved for each minimum resolution of a performance and each performance event is stored in one of the memory regions that corresponds to the time of occurrence of the performance event.

According to the above-described embodiments of the present invention, a music staff based on music piece data is visually displayed and a desired style of rendition is selected and pasted to a designated note on the displayed music staff. Thus, in the embodiments, the selection and input of the desired style of rendition are made in non-real time relative to an actual performance. However, the present invention is not so limited, and the selection and input of the desired style of rendition may be made in non-real time relative to an actual performance. For example, selection and input of a desired style of rendition may be accepted in real time while an automatic performance is being executed on the basis of automatic performance data and control data corresponding to the thus-accepted style of rendition may be read out from memory so that the style of rendition represented by the read-out control data is imparted to a tone being currently performed. At that time, it is preferable that the music staff of the automatically-performed music piece be visually displayed and the progression of the automatic performance be indicated by a color change, underline, arrow or the like, in order to allow the user to input a desired style of rendition with increased ease. Further, a desired style of rendition may be selected and input in real time to performance data being actually performed manually and control data corresponding to the thus-input style of rendition may be read out from memory so that the style of rendition represented by the read-out control data is imparted to a tone being currently performed manually.

Further, the preferred embodiments have been described above in relation to the scheme where a plurality of style-of-rendition icons are visually displayed as means for selectively inputting a desired style of rendition and the desired style of rendition is selected and input by clicking on a desired one of the style-of-rendition icons via the mouse pointer. However, the present invention is of course not limited to such a scheme alone. For example, a desired style of rendition may be selected by turning on one of a plurality of style-of-rendition selecting switches that correspond to a plurality of styles of rendition. In such a case, the styles of rendition selectable by the individual style-of-rendition selecting switches may be visually displayed in response to selection of a musical instrument (instrument's tone color) and, if necessary, selection of a state so that one of the selecting switches corresponding to a desired one of the styles of rendition can be turned on using the display. Namely, in this case, the function of each of the style-of-rendition selecting switches is varied variously in accordance with the selected musical instrument and/or other factor, rather than being fixed to a single style of rendition. As another preferred example, there may be provided one or more icon changing switches in such a way that a different set of the style-of-rendition icons can be displayed each time the one or more icon changing switches are turned on and a desired style of rendition can be selected and input by the user performing a given input operation based on the display.

Further, the present invention may be practiced in any other modifications than the above-described embodiments and modifications. Specifically, the present invention is not limited to the form of implementation where the software programs according to the present invention are executed by a computer, microprocessor or DSP (Digital Signal Processor); an apparatus or system performing the same functions as the above-described embodiments may be implemented using a hardware apparatus or system that is based on hard-wired logic comprising an IC or LSI, or gate arrays or other discrete circuits. Further, the terms "processor" as used in the context of the present invention should be construed as embracing not only program-based processors, such as computers and microcomputers, but also electric/electronic apparatus that are arranged to perform only predetermined fixed processing functions (i.e., the functions to perform the processing of the present invention) using an IC and LSI.

Furthermore, the present invention can be applied to other equipment and apparatus than the automatic performance apparatus, such as electronic musical instruments, other types of music performance apparatus and equipment, and tone reproduction apparatus and equipment. Moreover, the application of the present invention is not limited to the field of electronic musical instruments, dedicated music performance reproduction equipment or dedicated tone synthesis/control equipment; the present invention is of course applicable to the fields of apparatus and equipment, such as general-purpose personal computers, electronic game equipment, karaoke apparatus and other multimedia equipment, which have, as their auxiliary functions, music performance functions or tone generation functions.

The present invention arranged in the above-described manner affords the superior benefit that high-quality performance expressions or renditions as afforded by natural instruments can be imparted to automatic performance data by only selecting and imparting templates corresponding to a desired musical instrument and style of rendition.

What is claimed is:

1. An apparatus for inputting music-performance control data comprising:

memory storing a plurality of control data extracted from tone waveforms of acoustic musical instruments actually played in various styles of rendition;

a supply device adapted to supply music performance data;

an operator device; and a processor coupled with said memory, said supply device and said operator device, and adapted to:

select a desired style of rendition in response to operation of said operator device and in corresponding relation to one or more notes selected from among the music performance data; and read out, from said memory, one or more of the control data corresponding to the selected style of rendition, whereby a characteristic of the selected style of rendition is imparted to the selected notes in the music performance data.

2. An apparatus as claimed in claim 1 wherein said processor is adapted to incorporate style-of-rendition designating information indicative of the selected style of rendition into a sequence of the music performance data, and the style-of-rendition designating information is used to read out, from said memory, the one or more control data corresponding to the selected style of rendition.

3. An apparatus as claimed in claim 2 which further comprises a storage for storing a performance sequence and wherein the sequence of the music performance data having the style-of-rendition designating information incorporated therein is stored in said storage.

4. An apparatus as claimed in claim 1 wherein, said processor is adapted to:

select a desired style of rendition in real time in response to operation of said operator device and in corresponding relation to the music performance data supplied in real time by said supply device;

read out, from said memory, the control data corresponding to the selected style of rendition; and control a characteristic of a tone corresponding to the supplied music performance data in real time in accordance with the read-out control data, to thereby generate the controlled tone corresponding to the supplied music performance data.

5. An apparatus as claimed in claim 1 wherein said plurality of control data stored in said memory include control data corresponding to partial sounding segments of a tone, and each of said partial sounding segments corresponds to any one of a plurality of segmental states of the tone from a rise to fall thereof.

6. An apparatus as claimed in claim 1 wherein said plurality of control data stored in said memory include control data corresponding to a style of rendition that pertains to a plurality of notes to be performed in succession.

7. An apparatus as claimed in claim 6 wherein said plurality of control data stored in said memory include control data corresponding to a style of rendition that pertains to a connection between tow successive notes.

8. An apparatus as claimed in claim 1 wherein said memory has stored therein, in association with a style of rendition, at least two of control data indicative of a pitch variation over time, control data indicative of an amplitude variation over time and control data indicative of a tone color variation over time.

9. An apparatus as claimed in claim 1 wherein said memory has stored therein control data corresponding to a plurality of different tonal factors, in association with each individual style of rendition, and wherein each selectable style of rendition corresponds to one partial sounding segment of a tone, and in response to selection of a particular one of the styles of rendition, a plurality of the control data corresponding to the tonal factors of the partial sounding segment associated with the particular style of rendition are read out from said memory.

10. An apparatus as claimed in claim 1 wherein said memory has stored therein a plurality of control data different from each other in degree of control, in association with each group nominally similar styles of rendition, and wherein said processor is adapted to select the desired style of rendition by performing a combination of operations of selecting a group of nominally similar styles of rendition and selecting one of the degrees of control represented by the selected group of styles of rendition.

11. An apparatus as claimed in claim 1 wherein said plurality of control data stored in said memory include control data corresponding to at least one of a plurality of styles of rendition performable on wind instruments including bend-up, bend-down, bend-downup, grace-up, grace-down, chromatic-up, chromatic-down, gliss-up, gliss-down, staccato, vibrato, shortcut, tenuto, slur, crescendo and decrescendo renditions.

12. An apparatus as claimed in claim 11 wherein the control data corresponding to one style of rendition which is stored in said memory includes a plurality of variations pertaining to at least one of a plurality of rendition control factors including a depth and speed of the rendition and a specific number of tones involved in the rendition.

13. An apparatus as claimed in claim 1 wherein said processor is further adapted to generate a parameter for controlling the selected style of rendition and use the parameter to modify the control data read out from said memory in response to the selected style of rendition.

14. An apparatus as claimed in claim 1 wherein said plurality of control data stored in said memory include control data corresponding to at least one of a plurality of styles of rendition performable on rubbed string instruments, such as a guitar and bass, including choking, gliss-up, gliss-down, vibrato, bend-downup, shortcut, mute, hammer-on, pull-off, slide-up, slide-down, crescendo and decrescendo renditions.

15. An apparatus as claimed in claim 14 wherein the control data corresponding to one style of rendition which is stored in said memory includes a plurality of variations pertaining to at least one of a plurality of rendition control factors including a depth, speed and pitch of the rendition.

16. An apparatus as claimed in claim 1 wherein said plurality of control data stored in said memory include control data corresponding to at least one of a plurality of styles of rendition performable on wind instruments, such as a violin, including bend-up, grace-up, grace-down, staccato, detache, vibrato, bend-downup, shortcut, mute, chromatic-up, chromatic-down, gliss-up, gliss-down, tenuto, slur, crescendo and decrescendo renditions.

17. An apparatus as claimed in claim 16 wherein the control data corresponding to one style of rendition which is stored in said memory includes a plurality of variations pertaining to at least one of a plurality of rendition control factors including a depth and speed of the rendition and a specific number of tones involved in the rendition.

18. An electronic music apparatus comprising:

memory storing a plurality of control data extracted from tone waveforms of acoustic musical instruments actually played in various styles of rendition;

a supply device adapted to supply music performance data;

an operator device; and a processor coupled with said memory, said supply device and said operator device, and adapted to:

select a desired style of rendition in response to operation of said operator device and in corresponding relation to one or more notes selected from among the music performance data;

read out, from said memory, one or more of the control data corresponding to the selected style of rendition; and generate a tone corresponding to the music performance data with a characteristic controlled in accordance with the read-out control data corresponding to the selected style of rendition.

19. An electronic music apparatus comprising:

memory storing a plurality of control data extracted from tone waveforms of acoustic musical instruments actually played in various styles of rendition;

a supply device adapted to supply a performance sequence including music performance data and style-of-rendition designating information indicative of a style of rendition selected in corresponding relation to one or more notes selected from among the music performance data, said style-of-rendition designating information being used to read out, from said memory, one or more of the control data which correspond to the selected style of rendition; and a processor coupled with said memory and said supply device, and adapted to:

read out the control data corresponding to the style-of-rendition designating information from said memory, in accordance with the music performance data and style-of-rendition designating information of the performance sequence; and generate a tone corresponding to the music performance data with a characteristic controlled in accordance with the control data read out from said memory.

20. A method of inputting music-performance control data comprising the steps of:

storing in memory a plurality of control data extracted from tone waveforms of acoustic musical instruments actually played in various styles of rendition;

supplying music performance data;

selecting a desired style of rendition in response to operation of an operator device and in corresponding relation to one or more notes selected from among the music performance data; and reading out, from said memory, one or more of the control data corresponding to the selected style of rendition, whereby a characteristic of the selected style of rendition is imparted to the selected notes in the music performance data.

21. A machine-readable storage medium containing a group of instructions of a program executable by a processor for inputting music-performance control data, said processor being coupled with a memory storing a plurality of control data extracted from tone waveforms of acoustic musical instruments actually played in various styles of rendition and a supply device adapted to supply music performance data; said program comprising the steps of:

selecting a desired style of rendition in response to operation of an operator device and in corresponding relation to one or more notes selected from among the music performance data; and reading out, from said memory, one or more of the control data corresponding to the selected style of rendition, whereby a characteristic of the selected style of rendition is imparted to the selected notes in the music performance data.

22. A machine-readable storage medium containing data comprising:

music performance data, said music performance data includes note information arranged in a time-serial manner; and a plurality of control data extracted from tone waveforms of acoustic musical instruments actually played in various styles of rendition, said control data being used to control a processor to perform a step of imparting a characteristic of a desired style of rendition in corresponding relation to one or more notes selected from among music performance data.

* * * * *